United States Patent
Krohn et al.

(10) Patent No.: US 10,176,449 B1
(45) Date of Patent: Jan. 8, 2019

(54) TIMEOUT DURATIONS FOR RADIO FREQUENCY IDENTIFICATION TAGS

(71) Applicant: Amazon Technologies, Inc., Seattle, WA (US)

(72) Inventors: Justin Joel Krohn, Renton, WA (US); Steven Augustine Wilson, Brier, WA (US); Kun Qian, Seattle, WA (US); Wyatt David Camp, Seattle, WA (US); Sridhar Boyapati, Sammamish, WA (US); Dilip Kumar, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 14/964,299

(22) Filed: Dec. 9, 2015

Related U.S. Application Data

(63) Continuation of application No. 14/557,859, filed on Dec. 2, 2014, now abandoned.

(60) Provisional application No. 62/035,383, filed on Aug. 8, 2014.

(51) Int. Cl.
*G06K 15/00* (2006.01)
*G06F 19/00* (2011.01)
*G06Q 90/00* (2006.01)
*G06Q 10/08* (2012.01)
*G06K 7/10* (2006.01)

(52) U.S. Cl.
CPC ....... *G06Q 10/087* (2013.01); *G06K 7/10415* (2013.01)

(58) Field of Classification Search
USPC ....... 235/375, 383, 385, 451, 492; 340/10.1, 340/10.2, 10.34, 572.1
See application file for complete search history.

(56) References Cited

U.S. PATENT DOCUMENTS

| | | |
|---|---|---|
| 6,601,764 B1 | 8/2003 | Goodwin |
| 7,005,985 B1 * | 2/2006 | Steeves ............. G06K 7/10108 235/385 |
| 7,225,980 B2 | 6/2007 | Ku et al. |
| 7,339,479 B2 | 3/2008 | Nishimura |
| 7,548,165 B2 | 6/2009 | Braun et al. |
| 7,640,185 B1 | 12/2009 | Giordano et al. |
| 7,949,568 B2 | 5/2011 | Fano et al. |
| 8,009,864 B2 | 8/2011 | Linaker |
| 8,175,925 B1 | 5/2012 | Rouaix |
| 8,189,855 B2 | 5/2012 | Opalach et al. |
| 8,423,431 B1 | 4/2013 | Rouaix et al. |
| 8,542,834 B1 | 9/2013 | Feikis et al. |
| 8,630,924 B2 | 1/2014 | Groenevelt et al. |

(Continued)

FOREIGN PATENT DOCUMENTS

WO 2013126391 A1 8/2013

OTHER PUBLICATIONS

Sample, A.P "A Capacitive Touch Interface for Passive RFID tags", 2009 IEEE International Conference on RFID, pp. 103-109.

(Continued)

*Primary Examiner* — Tuyen K Vo
(74) *Attorney, Agent, or Firm* — Athorus, PLLC

(57) ABSTRACT

This disclosure describes the establishment, use and adjustment of timeout durations for individual RFID tags. Each RFID tag within an inventory system has a timeout duration that is based at least in part on a time duration between receipts of a RFID tag identifier associated with the RFID tag.

20 Claims, 10 Drawing Sheets

(56) References Cited

U.S. PATENT DOCUMENTS

| | | | |
|---|---|---|---|
| 8,688,598 B1 | 4/2014 | Shakes et al. | |
| 8,893,969 B2 | 11/2014 | Brandl | |
| 9,473,747 B2 | 10/2016 | Kobres et al. | |
| 2003/0002712 A1 | 1/2003 | Steenburgh et al. | |
| 2004/0181467 A1 | 9/2004 | Raiyani et al. | |
| 2005/0145688 A1 | 7/2005 | Milenkovic et al. | |
| 2005/0183990 A1 | 8/2005 | Corbett | |
| 2005/0200476 A1 | 9/2005 | Forr et al. | |
| 2005/0203798 A1 | 9/2005 | Jensen et al. | |
| 2005/0234774 A1 | 10/2005 | Dupree | |
| 2005/0243784 A1 | 11/2005 | Fitzgerald et al. | |
| 2006/0038658 A1* | 2/2006 | Jarvis | G06K 19/0701 340/10.1 |
| 2006/0145815 A1 | 7/2006 | Lanzieri et al. | |
| 2006/0186201 A1 | 8/2006 | Hart | |
| 2006/0208859 A1* | 9/2006 | Hougen | G06K 7/0008 340/10.1 |
| 2006/0244601 A1 | 11/2006 | Nishimura | |
| 2006/0267730 A1* | 11/2006 | Steinke | G06K 7/0004 340/10.1 |
| 2007/0018832 A1 | 1/2007 | Beigel et al. | |
| 2007/0021197 A1 | 1/2007 | Frerking | |
| 2007/0024423 A1* | 2/2007 | Nikitin | G06K 19/0723 340/10.1 |
| 2007/0030151 A1 | 2/2007 | Morrow | |
| 2007/0075861 A1 | 4/2007 | Cook et al. | |
| 2007/0091006 A1 | 4/2007 | Thober et al. | |
| 2007/0109101 A1 | 5/2007 | Colby | |
| 2007/0164863 A1 | 7/2007 | Himberger et al. | |
| 2007/0236337 A1* | 10/2007 | Braun | H04B 7/0606 340/10.34 |
| 2008/0048861 A1 | 2/2008 | Naidoo et al. | |
| 2008/0048862 A1* | 2/2008 | Kritt | G06Q 10/087 340/572.1 |
| 2008/0055087 A1 | 3/2008 | Horii et al. | |
| 2008/0077511 A1 | 3/2008 | Zimmerman | |
| 2008/0109114 A1 | 5/2008 | Orita et al. | |
| 2008/0174432 A1* | 7/2008 | Ulrich | G06K 7/0008 340/572.1 |
| 2008/0203158 A1 | 8/2008 | Wieser | |
| 2008/0232405 A1* | 9/2008 | Gallo | H04L 47/10 370/498 |
| 2008/0246613 A1* | 10/2008 | Linstrom | G08B 13/19695 340/572.4 |
| 2009/0033463 A1 | 2/2009 | Posamentier | |
| 2009/0085721 A1 | 4/2009 | Dishongh | |
| 2009/0121017 A1 | 5/2009 | Cato et al. | |
| 2009/0121843 A1* | 5/2009 | Bauchot | G06K 7/0008 340/10.31 |
| 2009/0167699 A1 | 7/2009 | Rosenblatt et al. | |
| 2009/0245573 A1 | 10/2009 | Saptharishi et al. | |
| 2010/0063652 A1 | 3/2010 | Anderson | |
| 2010/0097195 A1 | 4/2010 | Majoros et al. | |
| 2010/0114426 A1 | 5/2010 | Boss et al. | |
| 2010/0123581 A1 | 5/2010 | Hatfield et al. | |
| 2010/0271187 A1 | 10/2010 | Uysal et al. | |
| 2010/0308964 A1 | 12/2010 | Ackley et al. | |
| 2010/0328037 A1 | 12/2010 | Thomas et al. | |
| 2011/0011936 A1 | 1/2011 | Morandi et al. | |
| 2011/0163850 A1 | 7/2011 | Bachman et al. | |
| 2011/0227748 A1 | 9/2011 | Schaible et al. | |
| 2011/0266342 A1 | 11/2011 | Forster | |
| 2011/0285506 A1* | 11/2011 | Hillis | G08B 21/0238 340/8.1 |
| 2012/0012655 A1 | 1/2012 | Kai et al. | |
| 2012/0126911 A1 | 5/2012 | Romanko | |
| 2012/0284132 A1 | 11/2012 | Kim et al. | |
| 2013/0048724 A1 | 2/2013 | Burnside et al. | |
| 2013/0076898 A1 | 3/2013 | Philippe et al. | |
| 2013/0253700 A1 | 9/2013 | Carson et al. | |
| 2013/0284806 A1 | 10/2013 | Margalit | |
| 2014/0061303 A1* | 3/2014 | Brandl | G06K 7/10059 235/385 |
| 2014/0061382 A1 | 3/2014 | Tucker | |
| 2014/0176307 A1 | 6/2014 | Forster | |
| 2014/0279294 A1 | 9/2014 | Field-Darragh et al. | |
| 2015/0019391 A1 | 1/2015 | Kumar et al. | |
| 2015/0073907 A1 | 3/2015 | Purves et al. | |

OTHER PUBLICATIONS

Abhaya Asthana et al., "An Indoor Wireless System for Personalized Shopping Assistance", Proceedings of IEEE Workshop on Mobile Computing Systems and Applications, 1994, pp. 69-74, Publisher: IEEE Computer Society Press.

Cristian Pop, "Introduction to the BodyCom Technology", Microchip AN1391, May 2, 2011, pp. 1-26, vol. AN1391, No. DS01391A, Publisher: 2011 Microchip Technology Inc.

* cited by examiner

TIMEOUT DURATIONS FOR RADIO FREQUENCY IDENTIFICATION TAGS

CROSS-REFERENCE TO RELATED APPLICATION

This application claims priority to U.S. Provisional Application 62/035,383, filed Aug. 8, 2014, entitled "Dynamic Timeout For Active Tags" and U.S. patent application Ser. No. 14/557,859, entitled "Timeout Durations For Radio Frequency Identification Tags," both of which are incorporated herein by reference in their entirety.

BACKGROUND

Retailers, wholesalers, and other product distributors typically maintain an inventory of various items that may be ordered, purchased, leased, borrowed, rented, viewed, etc., by clients or customers. For example, an e-commerce website may maintain inventory in a fulfillment center. When a customer orders an item, the item is picked from inventory, routed to a packing station, packed and shipped to the customer. Likewise, physical stores maintain inventory in customer accessible areas (e.g., shopping area) and customers can locate items from within the store, pick the items from inventory and take them to a cashier for purchase, rental, etc.

It is often desirable to track inventory items at their location. Some fulfillment centers and/or physical stores may utilize barcodes, radio frequency identification tags, etc., to track inventory within the facility.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

Figure 1:
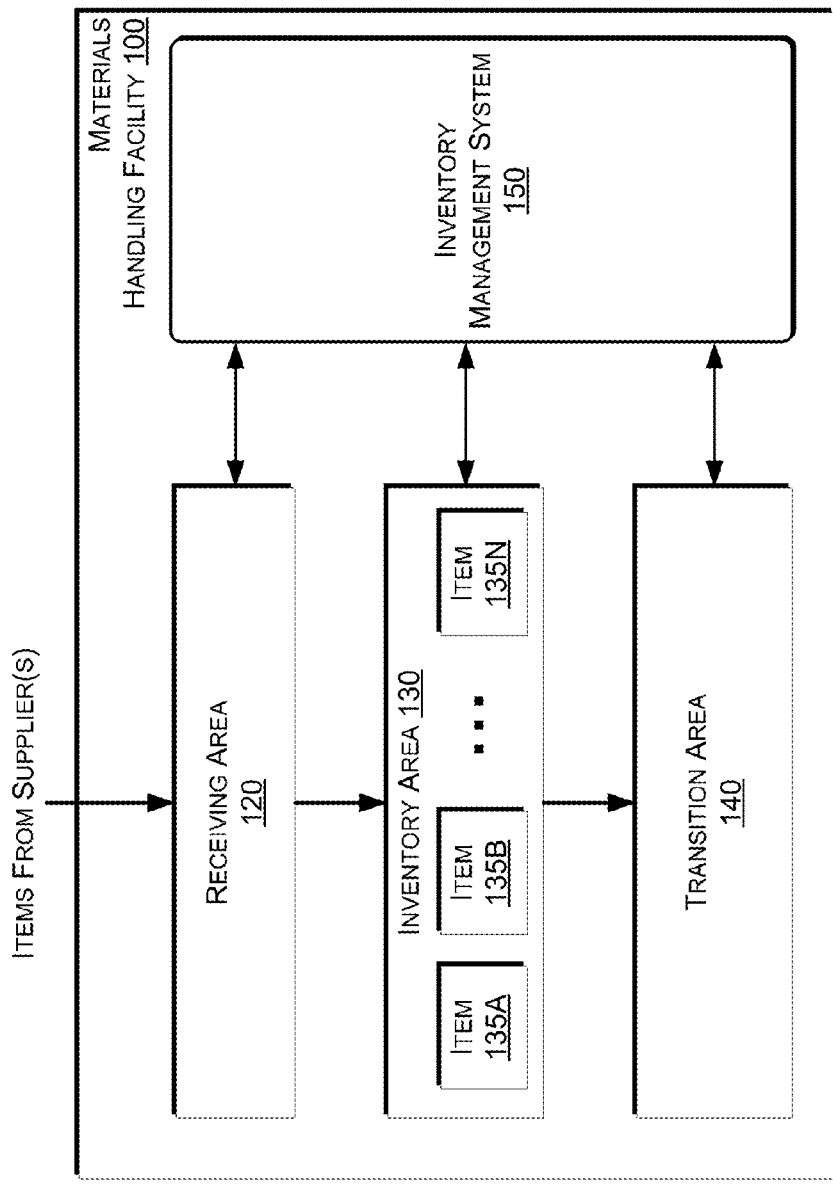
FIG. 1 is a block diagram illustrating a materials handling facility, according to one implementation.

While implementations are described herein by way of example, those skilled in the art will recognize that the implementations are not limited to the examples or drawings described. It should be understood that the drawings and detailed description thereto are not intended to limit implementations to the particular form disclosed but, on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION

This disclosure describes the ability to efficiently track inventory using radio frequency identification ("RFID") tags. For example, an inventory shelf located within a materials handling facility may include a series of antenna elements arranged along the shelf that communicate with a RFID reader. The antenna elements are configured to establish magnetic and/or electric fields oriented along at least a portion of the antenna element. The magnetic and electric fields can be used to read RFID tags included or attached to inventory items placed on the shelf. A multiplexer may also be utilized to enable the RFID reader to excite any combination of the antenna elements of the inventory shelf.

The RFID reader may utilize the antenna elements of the inventory shelf to perform an inventory mode to receive RFID tag identifiers from RFID tags located within a range of the antenna elements of the RFID reader. For example, during inventory mode, one or more antenna elements of a shelf may be excited and RFID tag identifiers received from RFID tags located on items positioned on the shelf. Generally, a single timeout duration is established all RFID tags and each RFID tag is expected to report and provide a signal that includes the RFID tag identifier at least once during the timeout duration. For example, a single timeout of five seconds may be set for all RFID tags in a system and each tag is expected to report and provide an instance of the corresponding RFID tag identifier at least once every five seconds.

Rather than setting a single timeout duration for all RFID tags to report, in some implementations, each RFID tag may have an associated timeout duration. For example, when a new RFID tag identifier is received by a RFID reader, a timeout duration may be established for that RFID tag based on a time duration between receipts of two or more responses from that RFID tag. For example, if a first RFID tag identifier for a first RFID tag is received approximately every 500 milliseconds, the timeout duration for that first RFID tag may be set to 1,500 milliseconds (e.g., three times the average delay time between receipts of the RFID tag identifier). Likewise, the RFID tag identifier of a second RFID tag may be received by the RFID reader approximately every 800 milliseconds. The timeout duration for that second RFID tag may be set to 2,400 milliseconds.

By setting timeout durations for each RFID tag, the accuracy and speed at which events (e.g., item pick) can be detected both improve. For example, an event of an item pick may be detected when an instance of a RFID tag identifier is not received by a RFID reader before an amount of time equal to the timeout duration has elapsed. Rather than setting all RFID tags to the same timeout duration, events for RFID tags that respond frequently may be detected quicker by lowering the timeout duration for that RFID tag. Likewise, for RFID tags that do not respond as frequently, the timeout duration may not be lowered (or even increased) so that event notifications are not improperly generated due to an amount of time equal to the timeout duration elapsing before an instance of the RFID tag identifier is received.

Received RFID tag identifiers may be included in an inventory table associated with the antenna element that received the RFID tag identifier. In a second mode, the RFID reader may perform a targeted read mode. During a targeted read mode, the RFID reader, utilizing one or more of the antenna elements, may issue a request for a selected RFID tag identified in the inventory table to reply to the request. If the RFID tag corresponding to the request responds before an amount of time equal to the timeout duration elapses, the RFID tag is determined to still be located within the range of the antenna element (e.g., on the portion of the shelf corresponding to the excited antenna element). If the RFID tag does not respond before an amount of time equal to the timeout duration elapses, the RFID tag may be determined to have been removed from within the range of the antenna element (e.g., removal of the inventory item that included the RFID tag). Removal of a RFID tag from a location is also referred to herein as an item pick.

The timeout duration may be utilized during inventory read mode and/or targeted read mode or with any other RFID interrogation techniques. Likewise, the timeout duration for each RFID tag may be the same or different depending on the read mode. In still other implementations, the timeout duration associated with inventory at the location may vary based on other inputs. For example, if a sensor (e.g., load cell) at the inventory location is not reporting any changes (i.e., there is no interaction with the inventory location), the timeout durations may be increased to further reduce any potential for improperly detected events (referred to herein as spurious events). When the load cell(s) reports a change (e.g., weight decrease) at the inventory location (an item has been picked), the timeout durations for RFID tags may be returned to their set values so that the item that has been picked can be quickly detected.

As used herein, a materials handling facility may include, but is not limited to, warehouses, distribution centers, cross-docking facilities, order fulfillment facilities, packaging facilities, shipping facilities, rental facilities, libraries, retail stores, wholesale stores, museums, or other facilities or combinations of facilities for performing one or more functions of materials (inventory) handling.

An implementation of a materials handling facility configured to store and manage inventory items is illustrated in FIG. 1. As shown, a materials handling facility 100 includes a receiving area 120, an inventory area 130 configured to store an arbitrary number of inventory items 135A-135N, and one or more transition areas 140. The arrangement of the various areas within materials handling facility 100 is depicted functionally rather than schematically. For example, in some implementations, multiple different receiving areas 120, inventory areas 130 and transition areas 140 may be interspersed rather than segregated. Additionally, the materials handling facility 100 includes an inventory management system 150 configured to interact with each of receiving area 120, inventory area 130, transition area 140 and/or users within the materials handling facility 100.

The materials handling facility 100 may be configured to receive different kinds of inventory items 135 from various suppliers and to store them until a user orders or retrieves one or more of the items. The general flow of items through materials handling facility 100 is indicated using arrows. Specifically, as illustrated in this example, items 135 may be received from one or more suppliers, such as manufacturers, distributors, wholesalers, etc., at receiving area 120. In various implementations, items 135 may include merchandise, commodities, perishables, or any suitable type of item depending on the nature of the enterprise that operates the materials handling facility 100.

Upon being received from a supplier at receiving area 120, items 135 may be prepared for storage. For example, in some implementations, items 135 may be unpacked or otherwise rearranged, and the inventory management system 150 (which, as described below, may include one or more software applications executing on a computer system) may be updated to reflect the type, quantity, condition, cost, location or any other suitable parameters with respect to newly received items 135. It is noted that items 135 may be stocked, managed or dispensed in terms of countable, individual units or multiples of units, such as packages, cartons, crates, pallets or other suitable aggregations. Alternatively, some items 135, such as bulk products, commodities, etc., may be stored in continuous or arbitrarily divisible amounts that may not be inherently organized into countable units. Such items 135 may be managed in terms of measurable quantities such as units of length, area, volume, weight, time duration or other dimensional properties characterized by units of measurement. Generally speaking, a quantity of an item 135 may refer to either a countable number of individual or aggregate units of an item 135 or a measurable amount of an item 135, as appropriate.

After arriving through receiving area 120, items 135 may be stored within inventory area 130 on an inventory shelf. In some implementations, like items 135 may be stored or displayed together in bins, on shelves or via other suitable storage mechanisms, such that all items 135 of a given kind are stored in one location. In other implementations, like items 135 may be stored in different locations. For example, to optimize retrieval of certain items 135 having high turnover or velocity within a large physical facility, those items 135 may be stored in several different locations to reduce congestion that might occur at a single point of storage.

When a user order specifying one or more items 135 is received, or as a user progresses through the materials handling facility 100, the corresponding items 135 may be selected or "picked" from inventory area 130. For example, in one implementation, a user may have a list of items to pick and may progress through the materials handling facility picking items 135 from the inventory area 130. In other implementations, materials handling facility employees (referred to herein as users) may pick items 135 using written or electronic pick lists derived from orders. In some instances, an item may need to be repositioned from one location within the inventory area 130 to another location. For example, in some instances, an item may be picked from its inventory area, moved a distance and placed at another location.

Figure 2:
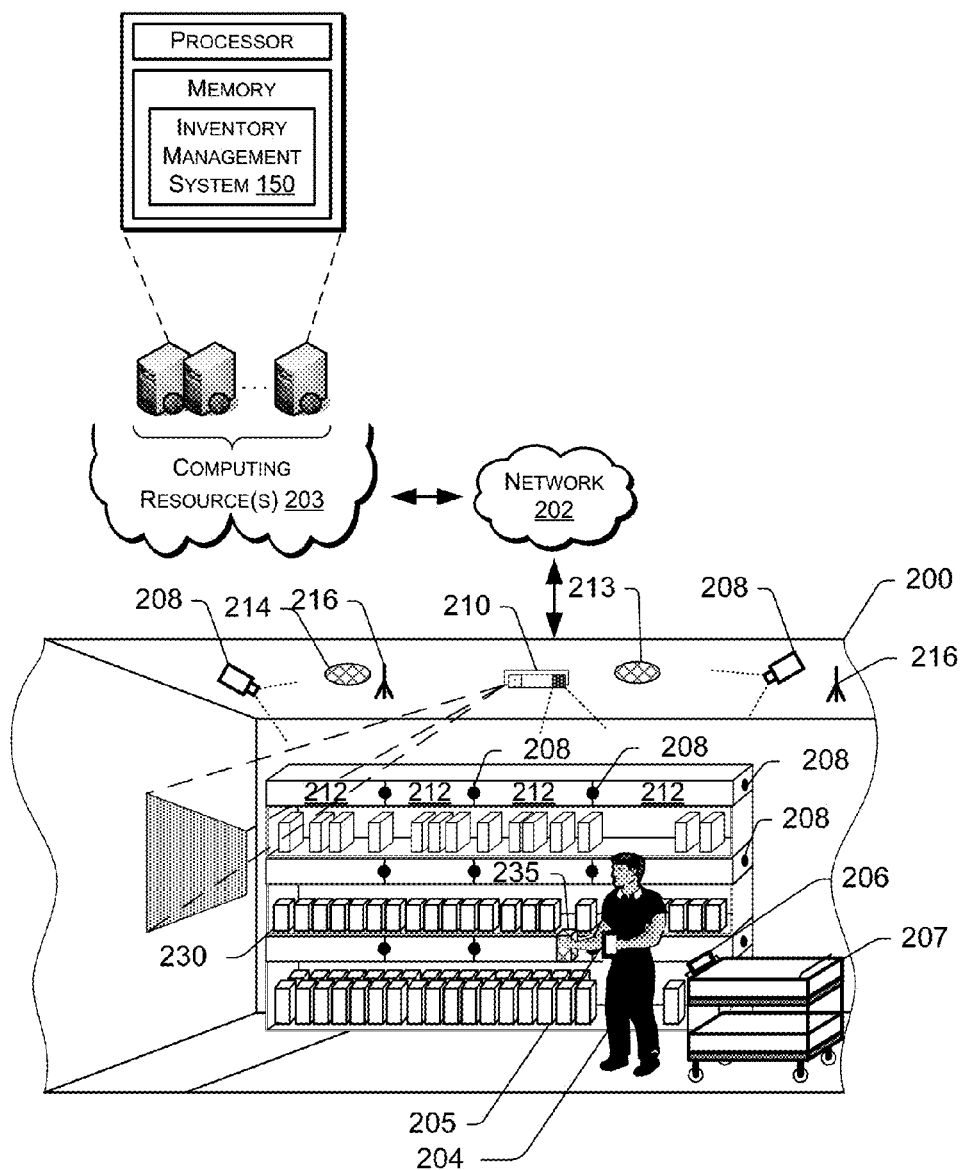
FIG. 2 shows additional components of the materials handling facility of FIG. 1, according to one implementation.

FIG. 2 shows additional components of a materials handling facility 200, according to one implementation. Generally, the materials handling facility 200 may include one or more image capture devices, such as cameras 208. For example, one or more cameras 208 may be positioned in locations of the materials handling facility 200 so that images of locations, items, and/or users within the materials handling facility can be captured. In some implementations, the image capture devices 208 may be positioned overhead, such as on the ceiling, to capture images of users and/or locations within the materials handling facility. In addition, in some implementations, one or more cameras 208 may be positioned on or inside of inventory areas. For example, a series of cameras 208 may be positioned on external portions of the inventory areas and positioned to capture images of users and/or the location surrounding the inventory area. Likewise, one or more cameras 208 may be positioned within the inventory areas to capture images of items stored in the inventory areas.

Any type of camera and/or configuration of cameras may be used with the implementations described herein. For example, one or more of the cameras may be RGB cameras, still cameras, motion capture/video cameras, etc. In other implementations, one or more of the cameras may be depth sensing cameras.

In addition to cameras, other input devices, such as pressure sensors, infrared sensors, scales, light curtains, load cells, RFID readers, etc., may be utilized with the implementations described herein. For example, a pressure sensor and/or a scale may be used to detect when an item is added and/or removed from inventory areas. Likewise, a light curtain may be positioned to cover the front of an inventory area and detect when an object (e.g., a user's hand) passes into or out of the inventory area. The light curtain may also include a reader, such as a RFID reader, that can detect a tag included on an item as the item passes into or out of the inventory location. For example, if the item includes a RFID tag, a RFID reader may detect the RFID tag as the item passes into or out of the inventory location. Alternatively, or in addition thereto, the inventory shelf may include one or more antenna elements coupled to a RFID reader that are configured to read RFID tags of items located on the inventory shelf. As described below, a list of RFID tag identifiers received from RFID tags coupled to items on the inventory shelf may be maintained and used to poll the RFID tags and confirm that they have not been removed.

An RFID tag generally refers to a device with an antenna or resonator that can produce a wireless signal when activated or powered. The wireless signal produced by the RFID tag is typically low power, and intended for transmission over short distances. For example, a RFID tag may be used to wirelessly transfer data using radio frequency electromagnetic fields. In a RFID tag system, data transfers occur in the form of modulated signals transmitted between a RFID tag, which may include various communication components, logic or circuitry, and a RFID reader, which may include antennas or other like devices. Data, such as a RFID tag identifier, stored within a microchip or other storage device associated with the RFID tag may be sent to the RFID reader, which may interpret not only the data received in the RFID tag signal but also other relevant information or attributes of the RFID tag signal, such as an intensity, strength, or a frequency of the RFID tag signal, as well as a direction from which the RFID tag signal originated, a range traveled by the RFID tag signal or at least some of the information or data included in the RFID tag signal.

The transfer of the RFID tag signal is initiated when an electric field or a magnetic field transmitted by a RFID reader is sensed by a RFID tag, which transmits information or data that may be stored in association with the RFID tag in one or more microchips or other storage devices.

RFID tag systems provide a number of advantages over similar systems for the short-range transfer of information or data. First, a RFID tag may be formed of components having remarkably small, compact shapes and sizes, and tags that are as thin as a sheet of paper or smaller than a grain of rice are quite common. Likewise, a RFID tag may be formed of any material and may be flexible or rigid. In some implementations, the RFID tag may include an adhesive on a portion of the exterior of a RFID tag surface to enable attachment of the tag to an item, such as an inventory item. Additionally, unlike a visual tag, such as a bar code (e.g., a one-dimensional bar code or a two-dimensional "QR" code), a RFID tag need not be provided within a line of sight of a RFID reader in order to successfully transmit data. Therefore, RFID tags may be concealed or embedded into many different types of objects of any size or shape, as well as humans or other animals. Next, a RFID tag may be programmed with a fixed set or packet of "read-only" data which may be transmitted to a RFID reader countless number of times in theory, or reprogrammed with modifiable sets of data that may be written and rewritten, as needed, based on the application in which the RFID tag is provided.

An RFID tag may be an active RFID tag in which the RFID tag includes an internal power supply (e.g., battery), a passive RFID tag in which the RFID tag does not include a power supply and is activated by power supplied by a RFID reader, a battery-assisted RFID tag in which the RFID tag includes a power supply (battery) but is activated by power supplied by a RFID reader, an active near field communication ("NFC") tag, a passive NFC tag, a Bluetooth tag, or any other type of tag that can be configured to provide an identifier over a radio frequency.

RFID tag signals may be transmitted from a RFID tag to a RFID reader in many different formats and at many different frequency levels. An RFID tag that transmits signals within low frequency (LF), medium frequency (MF) or high frequency (HF) levels (e.g., approximately 3 kilohertz to 30 megahertz, or 3 kHz-30 MHz) may transfer relatively small-sized sets or packets of data over short ranges (e.g., between one and one hundred centimeters, or 1-100 cm). Other RFID tags may transmit signals at higher frequency levels, such as ultrahigh frequency (UHF) or microwave levels (e.g., approximately 300 megahertz to 300 gigahertz, or 300 MHz-300 GHz) and may transmit larger sets or packets of data at ranges of one meter (1 m) or longer.

A signal transmission from a RFID tag to a RFID reader may be achieved in any number of ways. An inductively coupled or passive RFID tag is a RFID tag that is powered by energy obtained from magnetic fields generated by a RFID reader, and may be coupled to the RFID reader using this energy. In this regard, a RFID reader may include one or more coils through which an electric current may pass, thereby causing a magnetic field to be generated by the RFID reader according to Ampere's Law. Likewise, a passive RFID tag may also include one or more coils. When the RFID tag passes within a particular range of the RFID reader, an electric current is generated within the coils of the RFID tag, thereby coupling the RFID reader and the RFID tag based on the magnetic flux passing through the respective sets of coils. The electric current passing through the coils of the RFID tag may then power internal circuits within the RFID tag, and cause a RFID tag signal to be transmitted from the RFID tag to the RFID reader accordingly. Thus, passive RFID tags are commonly used in powerless environments where a passive system for transmitting signals may be required.

Additionally, a RFID tag may be coupled by any number of other modes. For example, capacitively coupled RFID tags include coupling plates that are designed to correspond to a plate of a RFID reader. When the RFID tag is placed in sufficiently close proximity to the RFID reader, thereby causing the corresponding coupling plates of the RFID tag and the RFID reader to be aligned in parallel with one another and within a short range, a transfer of data from the RFID tag to the RFID reader is achieved. Unlike an inductively coupled RFID tag, which is powered by a magnetic field generated by a RFID reader, a capacitively coupled RFID tag is powered by an alternating electric field generated by a RFID reader. For this reason, capacitively coupled RFID tags usually have more limited operating ranges than inductively coupled RFID tags and are typically employed in near-field communication environments. Similarly, a backscatter-coupled RFID tag receives power emitted from a RFID reader's antenna. A portion of the emissions from the RFID reader are received by a corresponding antenna of the RFID tag and may be filtered or rectified, as necessary, in order to trigger a transfer of data from the RFID tag to the RFID reader. Any type or mode of coupling between a RFID, semi-RFID (e.g., powered on a temporary basis or for limited purposes) or passive RFID tag and a RFID reader may be utilized in accordance with the present disclosure.

In addition to RFID tags which are automatically coupled with a RFID reader, the systems and methods of the present disclosure may further include a RFID tag, such as a passive RFID tag, which may be manually activated, e.g., coupled upon a manual action, by a human or machine in order to cause a transmission of a data signal from the RFID tag to one or more RFID readers. A manually activated RFID tag may include physical or virtual switches that may close a circuit within the RFID tag and thereby permit the RFID tag to function as a data transmitter in the presence of an electric or magnetic field. For example, a manually activated RFID tag may include capacitive elements that define a capacitor within the RFID tag, and may effectively close a circuit within the RFID tag when such elements detect bioelectricity from a user. The term "bioelectricity" generally refers to electrical charges or electric field gradients that may be stored within a living body, such as a human body, which contains blood and other matter having a variety of positively and negatively charged ions (e.g., sodium, chloride and others). Bioelectricity within a body may cause a change in capacitance of such elements in a vicinity of a location touched by the body (e.g., a digit such as a finger or thumb), due to disruptions in electrical fields caused by the body's presence, thereby further causing a change in the time constant of the RFID tag, and a discharge of the capacitor in an amount that may be defined as a function of the resistance of the capacitive elements.

According to some embodiments, such capacitive elements may be formed into a layered stack or may include a substantially linear or planar gap or break, and may be covered with a flexible protective layer formed from one or more plastics or rubbers (e.g., acrylics, vinyls, polyurethanes or the like), or other like materials. The protective layer may be adhered to one or more capacitive elements of a RFID tag circuit, which may include elements formed from a conductive material such as aluminum, copper, silicon or indium tin oxide that are separated by an air gap. When a user touches a protective layer of a RFID tag with a finger, which is a bioelectric conductor, a change in the effective capacitance (on the order of approximately one picofarad) between the elements, which are also conductors, in a vicinity of a point or points of contact with the protective layer is introduced. Such contact forms a conductive bridge across the elements, thereby causing disruptions in electrical fields in the vicinity of one or more of the elements, and further causing an internal current flow through the RFID tag circuit.

In addition to capacitive elements, a circuit of a RFID tag may include other components for enabling a manual actuation thereof by a human or a machine, including one or more substantially planar conductive elements that may be separated by an air gap. Such an air gap between the conductive elements defines an open switch within the circuit of the RFID tag, which may also be covered with a flexible protective layer that may be formed from one or more plastics, rubbers or other like materials. When a user contacts an external surface of the RFID tag corresponding to the air gap, e.g., the flexible protective layer over the air gap, at least two of the conductive elements are placed in contact with one another, thereby bridging the air gap between the conductive elements and closing the open switch. Subsequently, an internal current flow through the RFID tag circuit is enabled. Because the bridging of the air gap and the closure of the open switch is registered by manually driven electrical contact, a manually activated RFID tag including substantially planar conductive elements does not require bioelectricity in order to operate properly, and a user may interact with the RFID tag using not only his or her fingers or hands (which may be gloved or ungloved) but also a stylus, a pointer or another like object.

The systems and methods of the present disclosure are directed to tracking locations or conditions of items using RFID tag signals. As discussed herein, an item may be tagged with one or more RFID tags and a number of antenna antennas may be evenly distributed in discrete locations at an inventory location or other area where the item may be located. When the item arrives within a predefined range of one of the antenna elements, a RFID tag signal that includes, among other information, a RFID tag identifier is transmitted from the RFID tag on the item to one of the antenna elements, and subsequently to a RFID reader, which may recognize the item from which the RFID tag signal was transmitted, as well as the discrete location of the antenna element at which the RFID tag signal was received. In this regard, a location of the item within the inventory area may be determined based on the discrete location of the antenna element, and effectively pinpointed to within an operational range of the antenna element. Alternatively, where a RFID tag signal is not received from a RFID tag associated with a given item by any of the antenna elements, the systems and methods of the present disclosure may effectively confirm that the item has been picked from the location.

An RFID reader, as used herein, refers to any type of RFID reader that can communicate with, interrogate and/or receive information from a RFID tag.

When the user 204 arrives at the materials handling facility 200, one or more images of the user 204 may be captured and processed. For example, the images of the user 204 may be processed to identify the user 204. This may be done using a variety of techniques, such as facial recognition, pattern matching, etc. In some implementations, rather than or in addition to processing images to identify the user, other techniques may be utilized to identify the user. For example, the user may provide an identification (e.g., user name, password), the user may present an identifier (e.g., identification badge, card), a RFID tag in the possession of the user may be detected, a visual tag (e.g., barcode, bokode, watermark) in the possession of the user may be detected, biometrics may be utilized to identify the user, etc.

The captured images and/or other inputs may also be used to establish a user pattern for the user 204 while located in the materials handling facility 200. The user pattern may identify an overall shape of the user 204 and/or any distinguishing features of the user 204 (e.g., color of shirt, height) that may be used to assist in the identification and/or tracking of the user 204 as they progress through the materials handling facility 200.

In some implementations, a user 204 located in the materials handling facility 200 may possess a portable device 205 and obtain information about items located within the materials handling facility 200, receive confirmation that the inventory management system 150 has correctly identified items that are picked and/or placed by the user, receive requests for confirmation regarding one or more event aspects, etc. Generally, the portable device 205 has at least a wireless module to facilitate communication with the inventory management system 150 and a display (e.g., a touch based display) to facilitate visible presentation to and interaction with the user 204. The portable device 205 may store a unique identifier and provide that unique identifier to the inventory management system 150 and be used to identify the user 204. In some instances, the portable device 205 may also have other features, such as audio input/output (e.g., speaker(s), microphone(s)), video input/output (camera(s), projector(s)), haptics (e.g., keyboard, keypad, touch screen, joystick, control buttons) and/or other components.

In some instances, the portable device 205 may operate in conjunction with or may otherwise utilize or communicate with one or more components of the inventory management system 150. Likewise, components of the inventory management system 150 may interact and communicate with the portable device 205 as well as identify the user 204, communicate with the user 204 via other means and/or communicate with other components of the inventory management system 150.

A tote 207 may also be associated with the user. The tote may be any form of apparatus configured to hold and/or carry items. For example, the tote 207 may be a bag, cart, trolley, etc. In some implementations, the tote 207 may include a device or display 206, which may be configured in a manner similar to the portable device 205. For example, the display 206 may include a touch-based display, a memory, processor, speakers, wireless network connectivity, etc. In other implementations, the tote 207 may include one or more embedded output devices. For example, the tote 207 may include illumination elements, speakers, actuators, etc., incorporated into the tote that may be activated using the implementations discussed herein.

As discussed further below, event information and/or user interfaces may be presented to the user via the portable device 205, the display 206 and/or any other output device located within the materials handling facility 200. Likewise, the portable device 205, the display 206 and/or any other input device located within the materials handling facility may be used to receive input from the user.

Generally, the inventory management system 150 may include one or more input/output devices, such as imaging devices (e.g., cameras) 208, projectors 210, displays 212, speakers 213, microphones 214, illumination elements (e.g., lights), etc., to facilitate communication between the inventory management system 150 and/or the user 204. In some implementations, multiple input/output devices may be distributed within the materials handling facility 200. For example, there may be multiple imaging devices, such as cameras located on the ceilings and/or cameras (such as pico-cameras) located in the aisles near the inventory items.

Likewise, the inventory management system 150 may also include one or more communication devices, such as wireless antennas 216, that facilitate wireless communication (e.g., Wi-Fi, Near Field Communication (NFC), Bluetooth) between the inventory management system 150 and the portable device 205. The inventory management system 150 may also include one or more computing resource(s) 203, such as a server system, that may be local to the environment (e.g., materials handling facility), remote from the environment, or any combination thereof.

The inventory management system 150 may utilize antennas 216 within the materials handling facility 200 to create a network 202 (e.g., Wi-Fi) so that the portable device 205 and/or display 206 can connect to and communicate with the inventory management system 150. Likewise, in instances when one or more of the components of the inventory management system 150 are remote from the materials handling facility 200, they may communicate with other components of the inventory management system 150 and/or the portable device 205 via the network 202. For example, when the user picks an item 235 from an inventory area 230, the inventory management system 150 may receive information, such as a load cell change, RFID tag identifier update, an image of the user, and/or an image of the performed action (item pick from the inventory area), identifying that an item has been picked from the inventory area 230. The event aspects (user identity, action performed, item involved in the event) may then be determined and the inventory management system 150 may send a user interface and/or information to the portable device 205 for presentation to the user 204.

Figure 3:
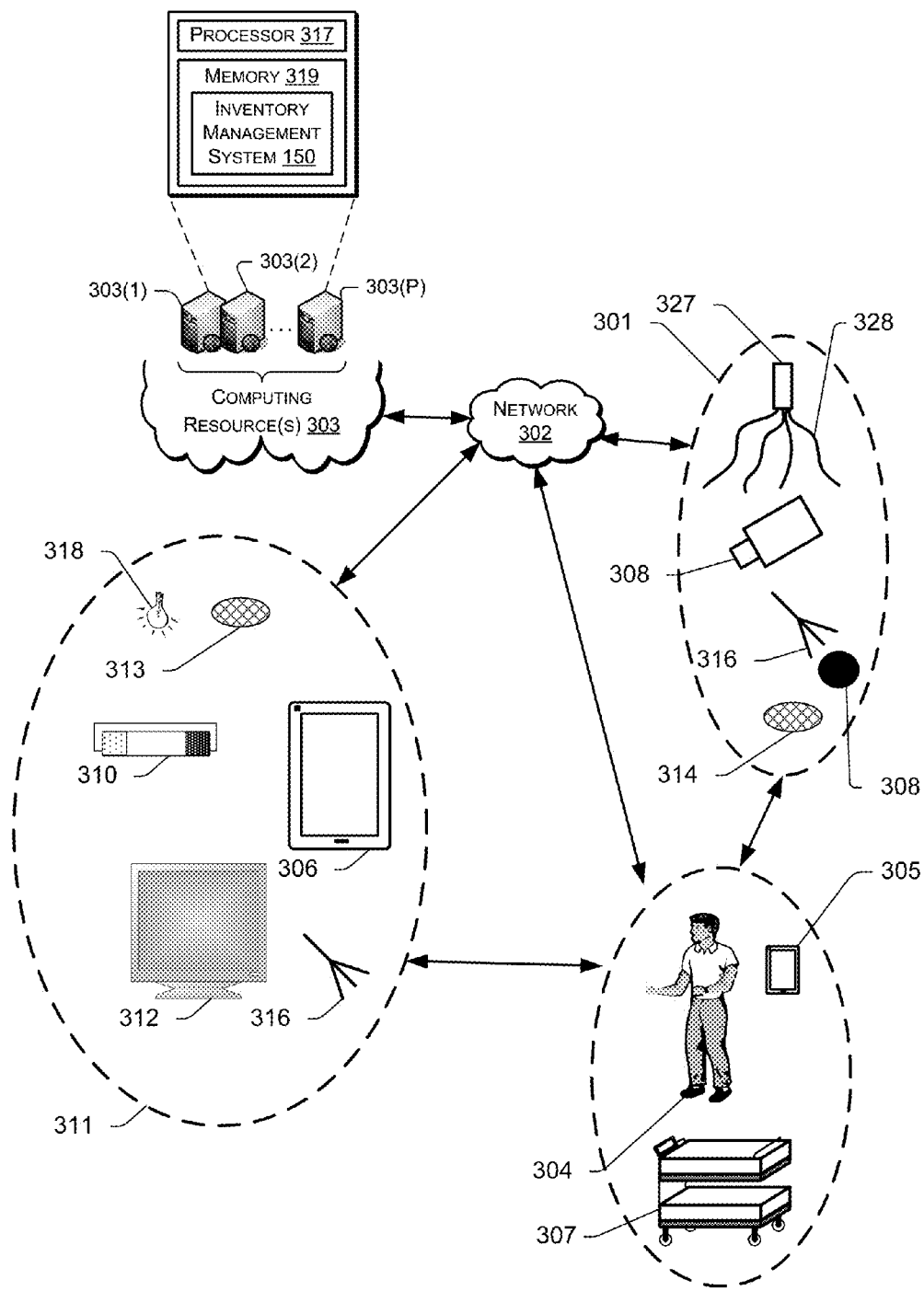
FIG. 3 shows components and communication paths between component types utilized in a materials handling facility of FIG. 1, according to one implementation.

FIG. 3 shows example components and communication paths between component types utilized in a materials handling facility 100, in accordance with one implementation. A portable device 305 may communicate and interact with various components of an inventory management system 150 over a variety of communication paths. Generally, the inventory management system 150 may include input components 301, output components 311 and computing resource(s) 303. The input components 301 may include an imaging device 308, microphone 314, antenna 316, a RFID reader 327 with one or more antenna elements 328, or any other component that is capable of receiving input about the surrounding environment and/or from the user. The output components 311 may include a projector 310, a portable device 306, a display 312, an antenna 316, a radio (not shown), speakers 313, illumination elements 318 (e.g., lights), and/or any other component that is capable of providing output to the surrounding environment and/or the user.

The inventory management system 150 may also include computing resource(s) 303. The computing resource(s) 303 may be local to the environment (e.g., materials handling facility), remote from the environment, or any combination thereof. Likewise, the computing resource(s) 303 may be configured to communicate over a network 302 with input components 301, output components 311 and/or directly with the portable device 305, the user 304 and/or the tote 307.

As illustrated, the computing resource(s) 303 may be remote from the environment and implemented as one or more servers 303(1), 303(2), . . . , 303(P) and may, in some instances, form a portion of a network-accessible computing platform implemented as a computing infrastructure of processors, storage, software, data access, and so forth that is maintained and accessible by components/devices of the inventory management system 150 and/or the portable device 305 via a network 302, such as an intranet (e.g., local area network), the Internet, etc. The server system 303 may process images of users 304 to identify the user 304, process images of items to identify items, determine a location of items and/or determine a position of items. The server system(s) 303 does not require end-user knowledge of the physical location and configuration of the system that delivers the services. Common expressions associated for these remote computing resource(s) 303 include "on-demand computing," "software as a service (SaaS)," "platform computing," "network-accessible platform," "cloud services," "data centers," and so forth.

Each of the servers 303(1)-(P) include a processor 317 and memory 319, which may store or otherwise have access to an inventory management system 150, which may include or provide image processing (e.g., for user identification, expression identification, and/or item identification), inventory tracking, and/or location determination.

The network 302 may utilize wired technologies (e.g., wires, USB, fiber optic cable, etc.), wireless technologies (e.g., radio frequency, infrared, NFC, cellular, satellite, Bluetooth, etc.), or other connection technologies. The network 302 is representative of any type of communication network, including data and/or voice network, and may be implemented using wired infrastructure (e.g., cable, CAT5, fiber optic cable, etc.), a wireless infrastructure (e.g., RF, cellular, microwave, satellite, Bluetooth, etc.), and/or other connection technologies.

Figure 4A:
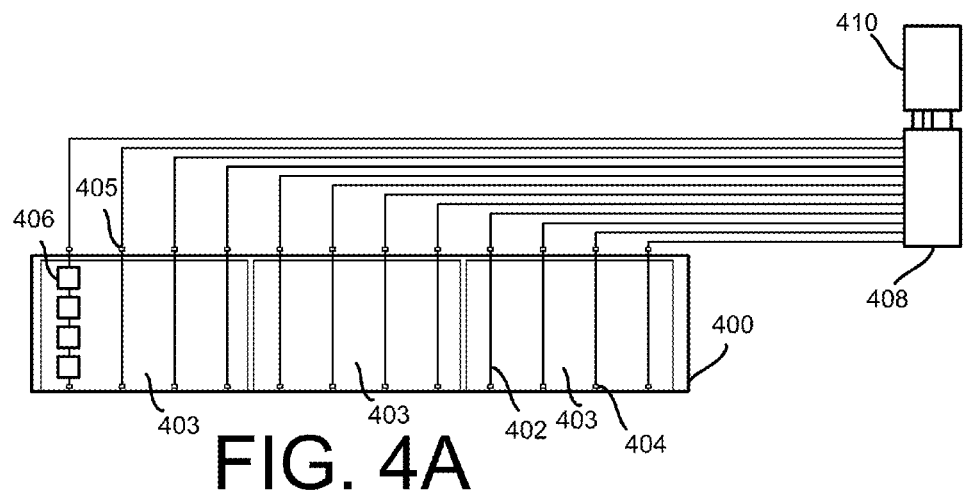
FIGS. 4A-4C are diagrams illustrating an antenna embedded inventory shelf, according to one implementation.

FIG. 4A is a top-down illustration of an antenna embedded inventory shelf 400, according to an implementation. The antenna embedded inventory shelf 400 includes a plurality of antenna elements 402 positioned along the antenna embedded inventory shelf 400. For example, two or more of the antenna elements 402 may be substantially parallel to each other and extend from the rear or back of the substrate toward the front of the substrate. In this example, there are twelve antenna elements 402. In other implementations, there may be fewer or additional antenna elements 402 included in the antenna embedded inventory shelf 400.

The spacing or separation between the antenna elements may be uniform across the antenna embedded inventory shelf 400 and/or may vary based on the size, type and/or number of inventory items 406 that may be placed on the antenna embedded inventory shelf 400. For example, the antenna elements may be spaced between approximately two inches and approximately six inches to accommodate different sizes of inventory items 406. In other implementations, the antenna elements may be included in a prefabricated sheet or set of antenna elements, such as antenna element sheets 403, each of which include four equally spaced antenna elements. The antenna element sheets may be placed adjacent to one another along the antenna embedded inventory shelf 400. To vary antenna element spacing along the antenna embedded inventory shelf 400, antenna element sheets having antenna elements with different spacings may be placed on the antenna embedded inventory shelf 400.

In one implementation, the antenna elements 402 are positioned on the antenna embedded inventory shelf 400 so that items placed on the antenna embedded inventory shelf 400 are positioned above each antenna element. For example, each row of inventory items 406 may be positioned over an antenna element 402. By positioning the inventory items over the antenna elements 402, RFID tags attached to or included in the inventory items may be energized by an antenna element 402. In some implementations, as discussed further below, when an antenna element and/or RFID reader receives a RFID tag identifier from a RFID tag, it may associate the RFID tag identifier with the receiving antenna element and/or the corresponding RFID reader. For example, each antenna element may include a unique position on the antenna embedded inventory shelf 400 and/or have a corresponding unique identifier. When the RFID tag identifier is received and added to the inventory table, the corresponding antenna location and/or antenna unique identifier may be associated with the RFID tag identifier and stored in the inventory table. Associating the RFID tag identifier and the antenna location and/or antenna unique identifier provides both location information for the inventory item associated with the RFID tag identifier and identifies the antenna element 402 that is to be excited to poll the RFID tag.

The antenna elements may be any type of antenna element capable of generating a field that can be used to energize a RFID tag so that communication with the RFID tag is enabled. For example, each antenna element may be a planar radiating transmission line. In other implementations, the antenna element may be another form of antenna, such as an omnidirectional antenna. In some implementations, the antenna elements may be configured to operate in both near field mode and far field mode. In near field, or magnetic mode, the magnetic fields generated by the antenna elements may be used to excite RFID tags within the field and read RFID tag identifiers stored on those RFID tags. For example, near field RFID tags may be placed in close proximity to the antenna elements by affixing them to the base of items. The near field RFID tags rely on magnetic coupling between the field of the antenna element and an antenna element to close the communication link so that the RFID tag identifier of the RFID tag can be read. Near field or magnetic mode is beneficial when dealing with items that are liquid filled, have a high dielectric constant or are a combination of both. Near field mode is also advantageous when a well-defined, constrained read zone is desired. This is due to the magnetic field strength falling off quickly with distance from the antenna element. In far field, or electric mode, far field tags within the field of the antenna element may also be excited and read.

Each antenna element may be terminated by a load resistor 404 in the characteristic impedance of the antenna element to reduce standing waves and improve the uniformity of field coverage of the field generated by the antenna element 402. The opposing end of each antenna element may, likewise, be coupled to a multiplexer 408. The multiplexer is coupled to and controlled by a RFID reader 410 that is configured to energize the antenna elements 402 and may be utilized with the implementations discussed herein. For example, the RFID reader 410 may control the multiplexer 408 to select one or more antenna elements 402 to energize to perform a targeted read mode, as discussed below. In another example, the RFID reader 410 may control the multiplexer 408 to select and energize all of the antenna elements 402 to perform an inventory read mode, as discussed below.

The RFID reader may receive instructions from the inventory management system to perform the operations discussed herein. For example, the inventory management system 150 may receive instructions to scan for RFID tag identifiers. In response, the RFID tag identifier will scan for RFID tag identifiers using an antenna element and provide the received RFID tag identifiers to the inventory management system. The inventory management system may likewise send other instructions to the RFID reader, such as those discussed below with respect to FIGS. 5-8.

While the example configuration illustrated in FIG. 4A identifies the multiplexer 408 as separate from the RFID reader 410, in other implementations, the multiplexer may be incorporated into the RFID reader 410.

In some implementations, each antenna element 402 may also include a matching circuit 405. The matching circuit may be used to determine the return power of the antenna element and/or to dynamically tune the antenna element. In some implementations, the matching circuit 405 may include adjustable capacitors and fixed inductors that can be adjusted to dynamically modify the impedance of the antenna element 402.

Figure 4B:
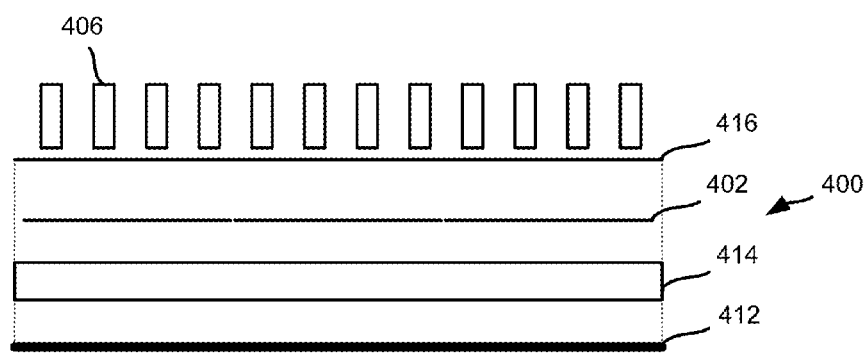

FIG. 4B is a cross-sectional view of the antenna embedded inventory shelf 400, in which each component of the antenna embedded inventory shelf is separated for purposes of illustration, according to an implementation. In the illustrated implementation, the antenna embedded inventory shelf 400 includes a ground plane 412, a substrate 414, antenna elements 402 and a protective cover 416. The ground plane 412 may be formed of any conductive material that can provide a common ground for the antenna embedded inventory shelf 400. The ground plane may be formed of any conductive material, such as metal, and may be of any thickness.

In one implementation, the ground plane 412 is a shelf of a standard gondola shelf system. A gondola shelf system typically includes a flat base and a vertical component featuring notches, pegboards, or slat walls. The vertical pieces are fitted with shelves, such as metal shelves, to support inventory items. Gondolas placed end-to-end can form rows of shelving. For example, an existing gondola shelf system located in a materials handling facility can be converted into an antenna embedded inventory shelf 400 by utilizing the existing gondola shelf as the ground plane 412 of the antenna embedded inventory shelf 400.

Adjacent to the ground plane 412 is a substrate 414 formed from a material having a low dielectric constant with respect to other materials. The substrate 414 may be coupled to the ground plane (permanently or temporarily), removably placed on the ground plane, etc. For example, if the ground plane is a metal shelf, the substrate 414 may be placed on the shelf. The substrate 414 may be formed of any low dielectric constant material, such as, but not limited to, acrylonitrile butadiene styrene ("ABS"), polystyrene, polyvinyl chloride ("PVC"), high-density polyethylene ("HDPE"), low-density polyethylene ("LDPE"), etc. The substrate is configured to improve the field above the antenna embedded inventory shelf 400 generated by the antenna elements 402 and to prevent or reduce the field below the antenna embedded inventory shelf 400. The substrate 414 is of a sufficient thickness to provide support to the antenna embedded inventory shelf 400 and improve the field above the antenna embedded inventory shelf 400. Generally, the substrate 414 may be at least approximately one-quarter of an inch thick. In one implementation, the substrate is approximately three-eighths of an inch thick.

Each of the antenna elements 402 are embedded into the top of the substrate 414, placed onto the top of the substrate 414, and/or affixed to the top of the substrate 414. For example, the antenna elements may be provided in fabricated sheets 403 with an adhesive back that are affixed to the top of the substrate 414. In other implementations, the antenna elements may be incorporated into printed circuits, provided as adhesive copper tape, etc., that are affixed to the top of the substrate 414. In still other implementations, the substrate 414 may be cut or etched and the antenna elements 402 incorporated into the top of the substrate 414. In the example illustrated in FIGS. 4A-4C, the antenna elements 402 are incorporated into fabricated sheets 403 that are affixed to the top of the substrate 414.

Finally, a protective cover 416 is affixed over the top of the antenna elements 402 and/or substrate 414 to provide a protective surface between the antenna elements 402 and inventory items that are placed onto the inventory shelf. The protective cover 416 may be formed of any material. In some implementations, the protective cover 416 is formed of the same material as the substrate 414. For example, the protective cover may be ABS, polystyrene, PVC, HDPE, LDPE, etc. The protective cover 416 may be any thickness sufficient to protect the antenna elements 402. For example, in some implementations, the protective cover 416 is approximately one-sixteenth of an inch thick.

In some implementations, the protective cover 416 may be formed of a porous plastic that is approximately 50% plastic and 50% air to provide a separation between the antenna elements 402 and the inventory items 406. For example, the protective cover 416 may be approximately one-quarter of an inch thick. Separating the antenna elements 402 and the inventory items 406 using a porous plastic protective cover 416 reduces detuning caused by the inventory items. While this example describes the use of a porous plastic, in other implementations, other materials may likewise be utilized.

Figure 4C:
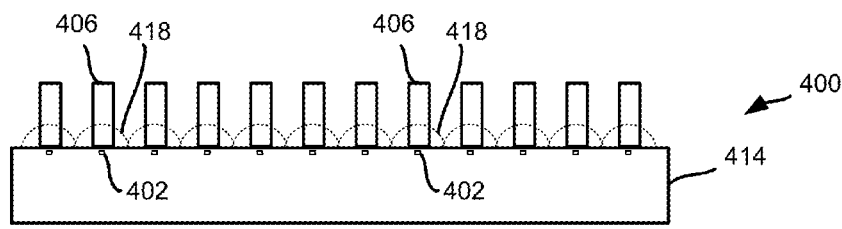

FIG. 4C is a side view of an antenna embedded inventory shelf 400, according to an implementation. As illustrated, when an antenna element 402 is excited, it generates a field 418, such as a magnet field or an electric field. For example, the antenna element 402 may generate a magnetic field for use in reading RFID tags. By positioning the antenna elements 402 along the shelf, inventory items 406 may be placed in rows on the shelf and the RFID tags attached to the inventory items 406 will be located in at least one field generated by the antenna elements 402 so that the RFID tag can be read and the item identified.

Utilization of the substrate 414 promotes the field 418 generated by the antenna elements 402 in a direction above the antenna embedded inventory shelf 400 and hinders propagation of the field below the antenna embedded inventory shelf 400, thereby reducing or prohibiting the reading of RFID tags located below the antenna embedded inventory shelf 400.

The fields 418 generated by the antenna elements 402 may have a footprint between approximately one inch and approximately six inches. Likewise, the antennas may be positioned or tuned so that the fields 418 generated by the antenna elements 402 overlap, to prevent locations on the antenna embedded inventory shelf 400 where a RFID tag is not readable by at least one antenna element 402.

Figure 5:
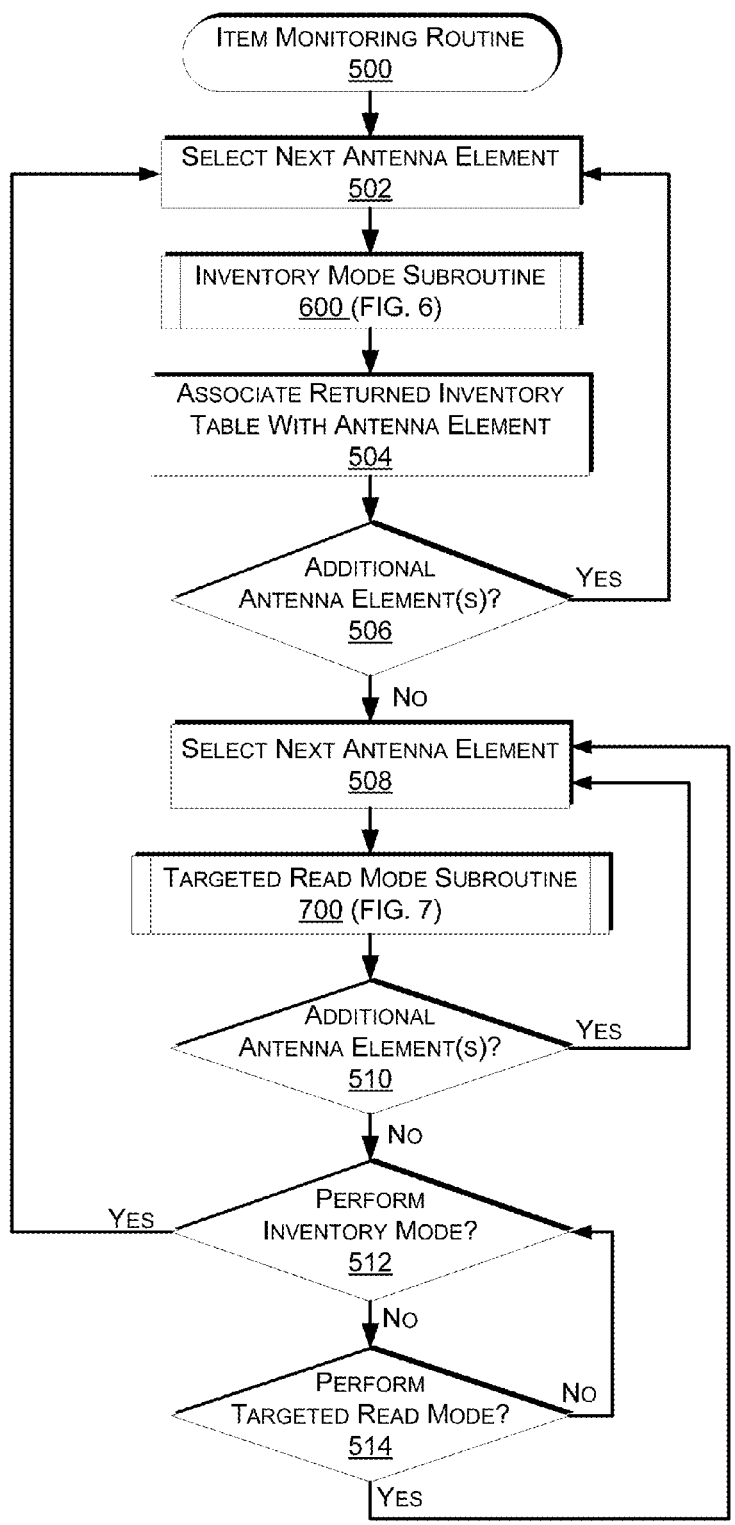
FIG. 5 is a flow diagram of an example item monitoring routine, according to one implementation.

FIG. 5 is a flow diagram of an example item monitoring routine 500, according to one implementation. The example routine of FIG. 5, and each of the other routines discussed herein, may be implemented in hardware, software, or a combination thereof. In the context of software, the described operations represent computer-executable instructions stored on one or more computer-readable media that, when executed by one or more processors, perform the recited operations. Generally, computer-executable instructions include routines, programs, objects, components, data structures, and the like that perform particular functions or implement particular abstract data types.

The computer-readable media may include non-transitory computer-readable storage media, which may include hard drives, floppy diskettes, optical disks, CD-ROMs, DVDs, read-only memories (ROMs), random access memories (RAMs), EPROMs, EEPROMs, flash memory, magnetic or optical cards, solid-state memory devices, or other types of storage media suitable for storing electronic instructions. In addition, in some implementations, the computer-readable media may include a transitory computer-readable signal (in compressed or uncompressed form). Examples of computer-readable signals, whether modulated using a carrier or not, include, but are not limited to, signals that a computer system hosting or running a computer program can be configured to access, including signals downloaded through the Internet or other networks. Finally, the order in which the operations are described is not intended to be construed as a limitation, and any number of the described operations can be combined in any order and/or in parallel to implement the routine.

The example item monitoring routine 500 begins by selecting an antenna element of a RFID reader, as in 502. In some implementations, a RFID reader may include one or more antenna elements, such as a set of antenna elements of an antenna embedded inventory shelf. Each antenna element may be associated with an inventory table maintained in a data store identifying RFID tag identifiers (such as EPCs) for RFID tags within a range of the antenna element. In other implementations, the RFID reader may maintain a single inventory table for all RFID tag identifiers received by all corresponding antenna elements of the RFID reader. In such an implementation, the inventory table may also identify the antenna element that received each RFID tag identifier.

Upon selecting an antenna element, the inventory mode subroutine 600 is performed. The inventory mode subroutine 600 is discussed in further detail below with respect to FIG. 6. Upon completion of the inventory mode subroutine 600, an inventory table for the selected antenna element is returned and the returned inventory table is associated with the antenna element, as in 504. The association may be maintained by the inventory management system in one or more data stores.

A determination may also be made as to whether there are additional antenna elements for which the inventory mode is to be performed, as in 506. For example, if the RFID reader includes multiple antenna elements, the inventory mode may be performed for each antenna element. In other implementations, the inventory mode may only be performed for some of the antenna elements associated with a RFID reader.

If it is determined that the inventory mode is to be performed for another antenna element, the example routine 500 returns to block 502 and continues. However, if it is determined that there are no additional antenna elements for which inventory mode is to be performed, an antenna element for which targeted read mode is to be performed is selected, as in 508. Targeted read mode may be performed periodically, a set number of times and/or based on input from other components of the materials handling facility. For example, if a load cell or sensor of an inventory location associated with the antenna element provides a notification that a weight has decreased (representative of an item pick), the targeted read mode may be performed for the inventory table associated with the corresponding antenna element. In another implementation, targeted read mode may be performed if a RFID tag does not respond during the timeout period established for that RFID tag.

Upon selection of an antenna element, the targeted read mode subroutine 700 is performed with respect to the inventory table associated with the selected antenna element, as in 700. The targeted read mode subroutine 700 is discussed further below with respect to FIG. 7. Upon completion of the targeted read mode, any items determined to be picked are identified and a notification may be provided to one or more users. For example, a user that is adjacent to the inventory location may receive a notification confirming an identity of a picked item.

A determination may also be made as to whether the targeted read mode subroutine 700 is to be performed with respect to any other antenna element, as in 510. If the targeted read mode subroutine 700 is to be performed with respect to another antenna element, the example routine 500 returns to block 508, the next antenna element is selected, and the example routine 500 continues. However, if it is determined that the targeted read mode subroutine is not to be performed with respect to another antenna element, a determination is made as to whether the inventory mode is to be performed again with respect to any of the antenna elements, as in 512. Likewise, a determination may be made as to whether the targeted read mode is to be performed with respect to any other antenna elements, as in 514.

Switching between targeted read mode and inventory mode may be done periodically and/or in response to other events occurring within the materials handling facility. In some implementations, inventory mode and/or targeted read mode may be terminated or the frequency of performance decreased until an event occurs near an antenna element. For example, the inventory mode and targeted read mode may only be performed with a low recurrence (e.g., once every 10 minutes) unless there is another event (e.g., user detection near an antenna element). If another event is detected, the inventory mode and/or targeted read mode may be performed.

Figure 6:
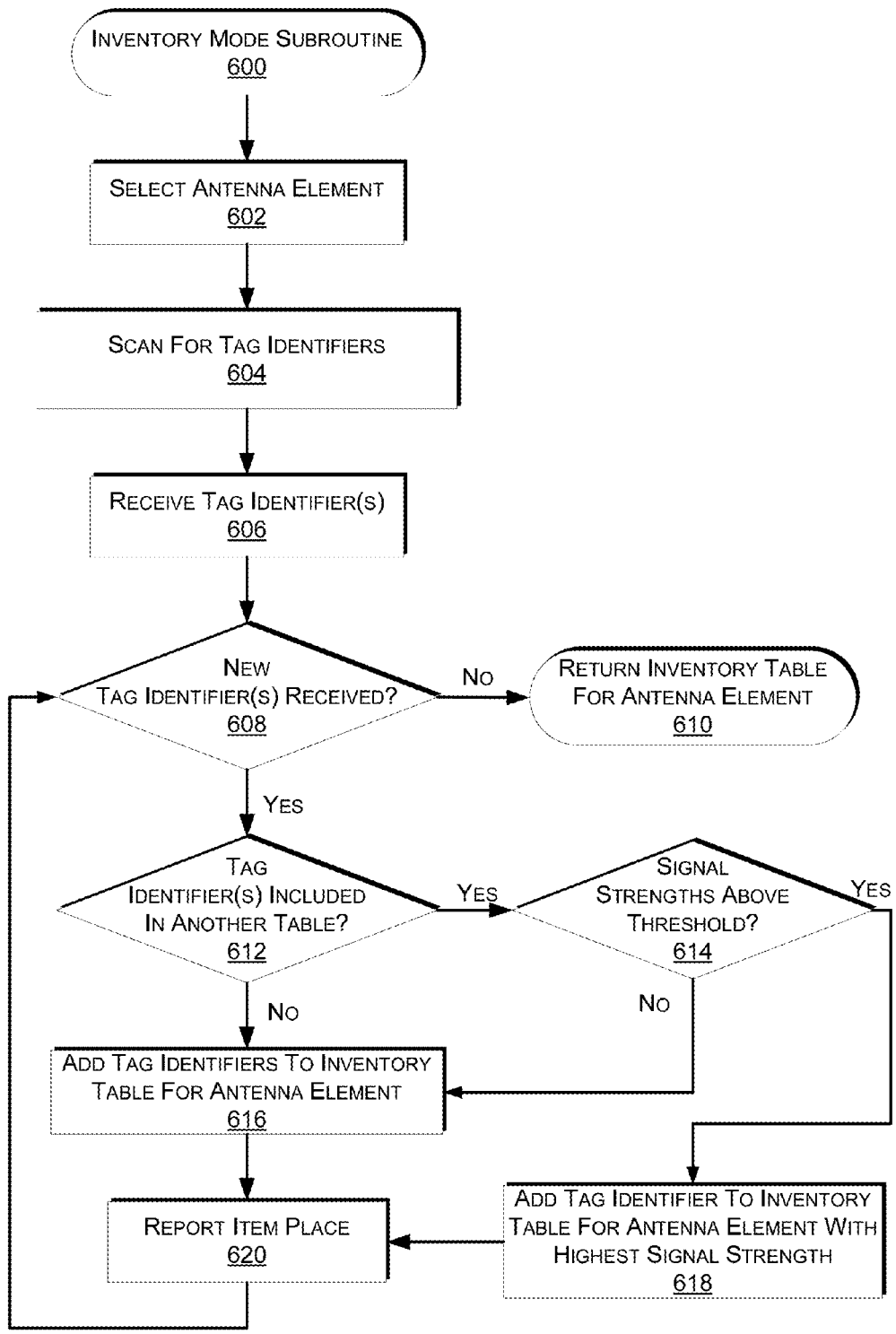
FIG. 6 is a flow diagram of an example inventory mode subroutine, according to one implementation.

FIG. 6 is a flow diagram of an inventory mode subroutine 600, according to an implementation. The inventory mode subroutine 600 begins by selecting an antenna element, as in 602. Upon selection of an antenna element, the selected antenna element is used to scan for RFID tags within range of the antenna element, as in 604. Scanning for RFID tags may be done using typical RFID tag scanning protocols, such as collision resolution protocols. As tags report and provide their RFID tag identifier (EPC), the example routine receives the tag identifiers, as in 606.

As each tag identifier is received, a determination is made as to whether the received tag identifier is new or already identified on an inventory table associated with the antenna element, as in 608. As discussed above, an inventory table may be associated with each antenna element and used to maintain a list of RFID tag identifiers detected by an antenna element. If it is determined that there are no new RFID tag identifiers received by the antenna element, the inventory table for the antenna element is returned, as in 610.

However, if it is determined that a RFID tag identifier is not already present on the inventory table associated with the antenna element that received the RFID tag identifier, a determination is made as to whether the RFID tag identifier is included on another inventory table and/or associated with another antenna element, as in 612. If it is determined that the RFID tag identifier is associated with another antenna element and/or identified on another inventory table, a determination is made as to whether the signal strength corresponding to one or more of the antenna elements that received the RFID tag identifier is above a threshold, as in 614. The threshold may be any defined value or amount and may be different for different antenna elements, different locations within the materials handling facility, different items, etc.

If it is determined that the signal strengths of the antenna elements that received the RFID tag identifier are not above the threshold, or if it is determined that the received RFID tag is not identified on another inventory table or associated with another antenna element, the RFID tag identifier is added to the inventory table associated with the antenna element, as in 616. Likewise, as discussed below with respect to FIG. 8, a timeout duration for the RFID tag may also be determined.

If it is determined at decision block 614 that the signal strength of one of the antenna elements that received the RFID tag identifier does exceed the threshold, the RFID tag identifier is added to the inventory table associated with the antenna element having the highest signal strength for receiving the RFID tag identifier.

After adding the RFID tag identifier to an inventory table in block 616 or block 618, the example subroutine reports an event of an item place for an item associated with the detected RFID tag identifier, as in 620. An item place may represent the addition of an item that includes the RFID tag identifier at a location that is within range of the field of the antenna element. In some implementations, the item place may identify the antenna element, the location within the materials handling facility corresponding to the antenna element, the received RFID tag identifier, a signal strength at the antenna when the RFID tag identifier is received, a time at which the RFID tag identifier was received, etc. After reporting an item place, the example subroutine 620 returns to block 608 and continues.

Figure 7:
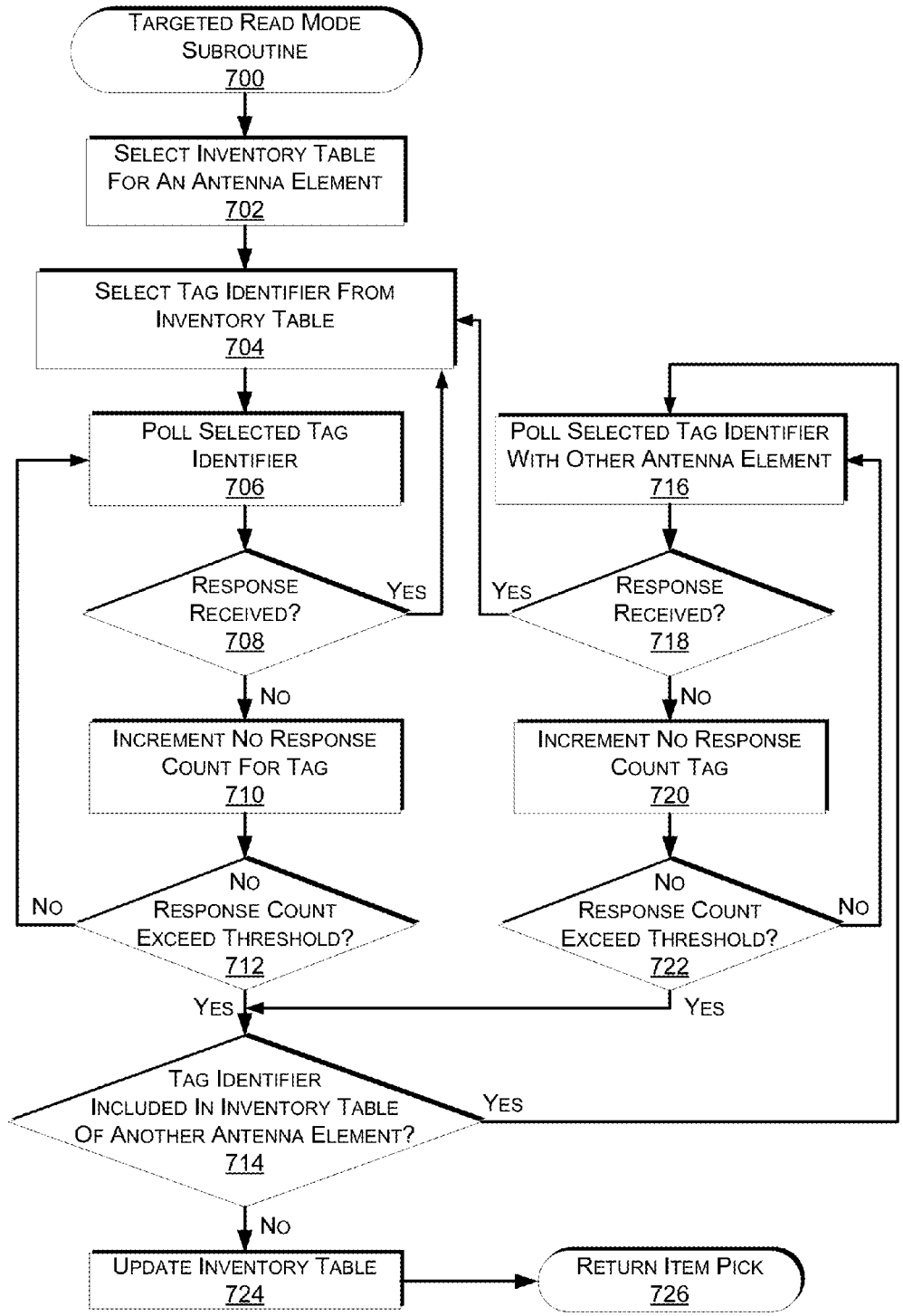
FIG. 7 is a flow diagram of an example targeted read mode subroutine, according to one implementation.

FIG. 7 is a flow diagram of an example targeted read mode subroutine 700. The example subroutine 700 begins by selecting an inventory table for an antenna element, as in 702. As discussed above, separate inventory tables identifying RFID tag identifiers may be maintained for each antenna element of a RFID reader. In other implementations, the RFID reader may maintain an inventory table for all antenna elements associated with the RFID reader and maintain an association between the received RFID tag identifiers and the antenna elements that received the RFID tag identifiers.

For a selected inventory table, a RFID tag identifier is selected, as in 704. The selected RFID tag identifier may be randomly selected or selected in response to another event. For example, if response has not been received from a RFID tag, the corresponding RFID tag identifier may be selected.

For a selected RFID tag identifier, the example subroutine 700 utilizes the corresponding antenna element to poll the RFID tag to determine if the RFID tag is still within the range of the antenna element, as in 706. Polling may be enabled by masking the data packets transmitted by the antenna element. For example, in Gen2 RFID systems, a masking feature may be included in a packet (e.g., query packet, select packet). The RFID tags may be configured to read the information in the mask, compare the information with stored information and perform a defined action based on the comparison. For example, the RFID tag identifier may be included in the mask. Receiving RFID tags may compare the RFID tag identifier included in the mask with their own RFID tag identifier. If the RFID tag identifier of the mask corresponds to the RFID tag identifier stored by the RFID tag, the RFID tag may provide a response (defined task). If the RFID tag identifiers do not match, the RFID tag may not respond.

This process of targeted read mode eliminates collisions of multiple tags reporting at the same time, thereby reducing the latency inherent in existing systems.

After polling a selected RFID tag, a determination is made as to whether the RFID tag has responded prior to expiration of an amount of time equal to the timeout duration established for the RFID tag, as in 708. If it is determined that the RFID tag has responded, the example subroutine 700 returns to block 704 and continues. However, if no response is received before expiration of an amount of time equal to the timeout duration, a no response count for the RFID tag identifier is incremented, as in 710. After incrementing the no response count for the RFID tag, a determination is made as to whether the no response count for the RFID tag exceeds a count threshold, as in 712. The count threshold may be any defined number of retries that are to be performed by the example subroutine. For example, the count may be set to five, such that five attempts or polls are made for the selected RFID tag before the count threshold is exceeded for the selected RFID tag. In other implementations, the count may be set to zero, such that an event is triggered the first time the RFID tag does not respond prior to an amount of time equal to the timeout duration elapsing.

If it is determined that the count threshold has not been exceeded for the RFID tag, the example subroutine 700 returns to block 706 and continues. However, if it is determined that the count has been exceeded, a determination is made as to whether the RFID tag identifier is associated with another antenna element and/or identified in another inventory table, as in 714. If it is determined that the RFID tag identifier is included in another inventory table and/or associated with another antenna element, the other antenna element is used to poll the RFID tag, as in 716. Polling using another antenna element may be done as discussed above with respect to block 706.

Similar to blocks 708-712, after polling the RFID tag using another antenna element, a determination is made as to whether a response is received, as in 718. If a response is received, the example subroutine returns to block 704 and continues. If a response is not received, the no response count is incremented, as in 720, and a determination is made as to whether the no response count for the RFID tag from that antenna element exceeds a threshold, as in 722. If the no response count does not exceed the threshold, the example subroutine 700 returns to block 716 and continues. The count threshold for additional antenna elements may be the same or different than the count threshold for other antenna elements.

If it is determined that the count threshold has been exceeded at decision block 722, the example subroutine 700 returns to decision block 714 and continues. If it is determined at decision block 714 that the RFID tag identifier is not associated with another antenna element and/or another inventory table, the inventory table is updated to remove the RFID tag identifier from the inventory table, as in 724. In addition, an event of an item pick may be returned, as in 726. An item pick may be an identification that an item that was associated with the RFID tag that is no longer detected has been picked or removed from the location within the range of the antenna element. The pick may identify, for example, the antenna element, the location within the materials handling facility associated with the antenna element, a time at which the RFID tag was determined to no longer be present, the RFID tag identifier, etc.

Figure 8:
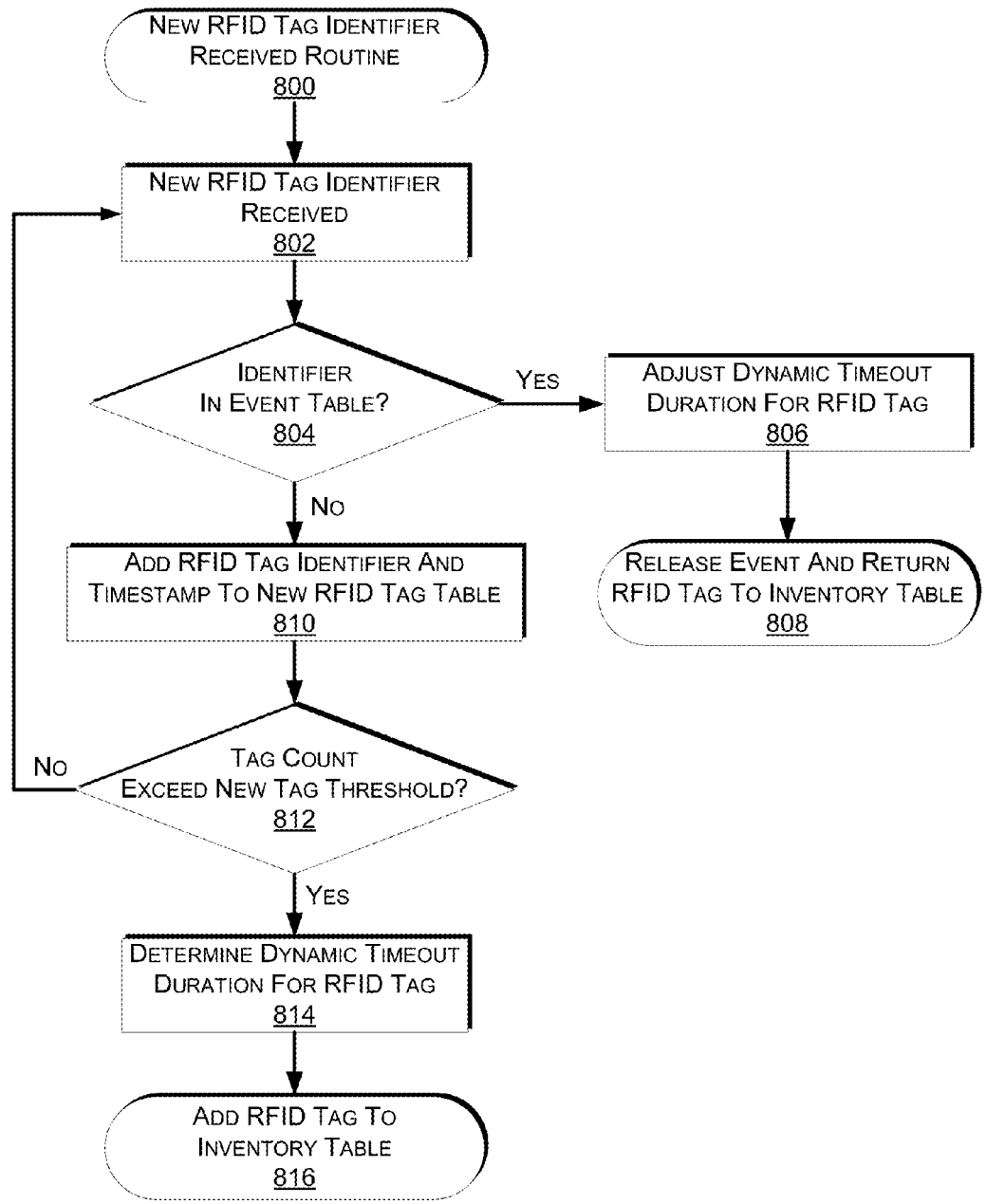
FIG. 8 is a flow diagram of a new RFID tag identifier received routine, according to one implementation.

FIG. 8 is a flow diagram of an example routine for detecting a new RFID tag and establishing a timeout duration for the RFID tag, according to an implementation. The example routine 800 begins when a new RFID tag identifier is received by a RFID reader, as in 802. For example, during inventory mode, a RFID tag identifier may be received that is not included on the inventory table data store associated with an antenna element. Upon receipt of a new RFID tag identifier, a determination is made as to whether the new RFID tag identifier is included on an event table, as in 804. As discussed below with respect to FIG. 9, when an event (e.g., item pick) is determined, the RFID tag identifier involved in the event is added to an event table.

Information included in an event table may be maintained for a defined period of time. For example, item information may only be retained in an event table for fifteen seconds.

If it is determined at decision block 804, that the received RFID tag identifier is included in an event table, the timeout duration for the RFID tag may be adjusted, as in 806. Adjusting the timeout duration for a RFID tag is discussed further below with respect to block 916 of FIG. 9. In addition to adjusting the timeout duration for the RFID tag, the event (e.g., item pick) may be released or canceled and the RFID tag identifier added back to the inventory table. For example, the event may be a pick of an item that is associated with a RFID tag. The event may be generated when a response has not been received from the RFID tag prior to an amount of time equal to the timeout duration elapsing. If the event has not been purged or removed from the event table when the RFID tag identifier is received, the event may be canceled and the RFID tag identifier added back to the inventory table.

Returning to decision block 804, if it is determined that the received RFID tag identifier is not included in the event table, the tag identifier and a timestamp identifying a receipt time of the RFID tag are added to a new RFID tag table, as in 810. The new RFID tag table identifies tags that are not included in the RFID inventory table associated with the antenna element and/or RFID reader that received the RFID tag identifier. For example, a new item with a new RFID tag may be placed at the inventory location, thereby resulting in a new RFID tag identifier being received by an antenna element and corresponding RFID reader associated with that inventory location. As another example, an item that has been picked from the inventory location and kept for a period of time that exceeds the dynamic threshold (the event has been detected and the RFID tag identifier has been purged from the event table) and then returned to the inventory location will result in the RFID tag being identified as a new RFID tag for that inventory location. In addition to adding the RFID tag identifier and timestamp to the new RFID tag table, other information may also be added. For example, the antenna that received the RFID tag identifier may be identified and included with the RFID tag identifier in the new RFID tag table.

A determination may then be made as to whether a tag count for the received RFID tag identifier exceeds a new item threshold, as in 812. The tag count may be the number of times the RFID tag identifier has been received by the RFID reader during a defined period of time (e.g., thirty seconds). The new item threshold may be any defined value. For example, the new item threshold may be set to three, such that at least three instances of receipt of the RFID tag identifier by the RFID reader must occur before the corresponding RFID tag is considered for addition to the inventory table associated with the RFID reader. In other implementations, the new item threshold may be a higher number or a lower number (e.g., zero).

If it is determined that the tag count does not exceed the new item threshold, the example process 800 returns to block 802 and continues. However, if the tag count does exceed the new tag threshold, a timeout duration is determined for the RFID tag identifier, as in 814. In some implementations, the initial timeout duration may be the same for all RFID tags (e.g., five seconds). In other implementations, a determination may be made as to the time duration between each receipt of the RFID tag identifiers that were added to the new tag table and an average of those time durations utilized as a basis for establishing a timeout duration for the RFID tag. For example, if the new tag threshold requires that the RFID tag identifier be received five times before the RFID tag identifier is added to the inventory table, the time duration between receipts of each of the five RFID tag identifiers may be determined and utilized as a basis for establishing the timeout duration for the RFID tag. For example, the timeout duration may be set as two times the average time duration between instances of receipt of the RFID tag identifier. In another implementation, the timeout duration may be set as the longest time duration between instances of receipt of the RFID tag identifier or a multiple of the longest time duration. In another example, the timeout duration may be set as three standard deviations from the mean of the measured time durations between instances of receipt of the RFID tag identifier. Other factors or characteristics may likewise be used for selecting a timeout duration for the RFID tag.

Upon selecting a timeout duration for the RFID tag, the RFID tag identifier associated with the RFID tag is added to the inventory table, as in 816. For example, the RFID tag identifier may be associated with the antenna element that received the RFID tag identifier and the associated inventory item added to the inventory data store for that location.

Figure 9:
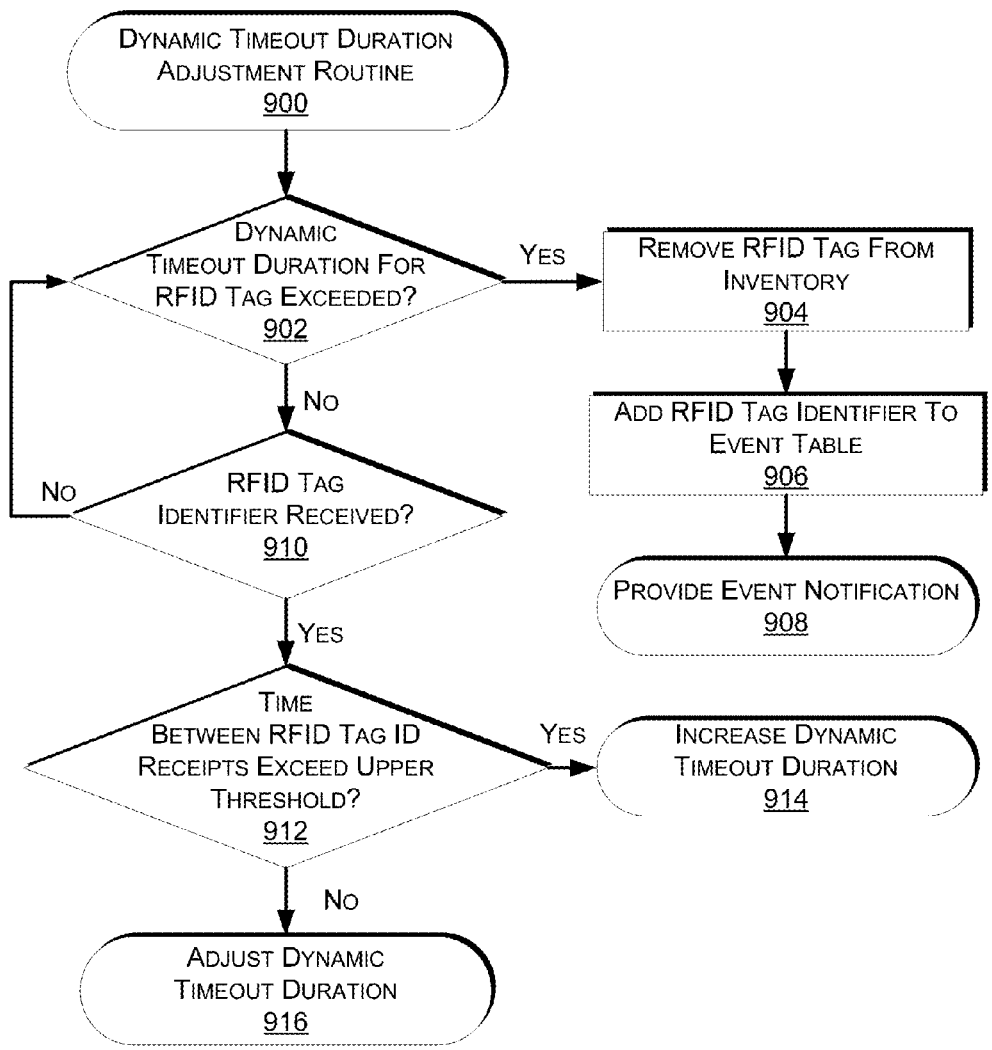
FIG. 9 is a flow diagram of a timeout adjustment routine, according to one implementation.

FIG. 9 is a flow diagram of a timeout adjustment routine 900 for dynamically adjusting the timeout duration for a RFID tag, according to an implementation. The example routine 900 begins by determining if the timeout duration for a RFID tag has been exceeded, as in 902. The timeout duration may be any value or period of time by which a RFID tag identifier is expected to be received from a RFID tag. If it is determined that the timeout duration has been exceeded, the RFID tag identifier is removed from the inventory table, as in 904.

As discussed above, if a RFID tag identifier is not received before an amount of time equal to the timeout duration elapses, an event of an item pick is generated for the item associated with the RFID tag. As part of the event, the RFID tag identifier is added to an event table, as in 906. Likewise, an event notification is provided to the inventory management system, as in 908. The inventory management system may utilize the event notification to perform one or more other actions (e.g., adding the inventory item associated with the RFID tag identifier to an item identifier list associated with a user).

Returning to decision block 902, if it is determined that the timeout duration for the RFID tag has not been exceeded, a determination is made as to whether the RFID tag identifier for the RFID tag has been received, as in 910. If the RFID tag identifier for the RFID tag has not been received, the example process returns to decision block 902 and continues.

If the RFID tag identifier for the RFID tag has been received, a determination is made as to whether the time duration between the current receipt of the RFID tag identifier and the prior instance of receipt of the RFID tag identifier exceeds an upper threshold, as in 912. The upper threshold may be any defined value that, if exceeded, will cause an increase to the timeout duration for the RFID tag. For example, the upper threshold may be a percentage of the timeout duration (e.g., 95%) and, if the time duration is exceeds that percentage, it is determined that the time duration has exceeded the upper threshold. For example, if the timeout duration for the RFID tag is one second and the time duration between the last two instances of receipt of the corresponding RFID tag identifier is greater than 0.95 seconds, it may be determined that the upper threshold has been exceeded.

If it is determined that the upper threshold has been exceeded, the timeout duration for the RFID tag is increased, as in 914. Increasing the timeout duration may be done to reduce the likelihood of an event being triggered incorrectly (referred to herein as a spurious event). The timeout duration may be increased by any defined amount. For example, the timeout duration may be increased by half of its original value (e.g., the timeout duration may be increased from 1.0 second to 1.5 seconds). In other implementations, the amount of the increase may vary based on the delay time between receipts of the RFID tag identifier, the amount by which the upper threshold is exceeded, the signal strength of the received RFID tag identifier, etc.

Returning to decision block 912, if it is determined that the time duration does not exceed the upper threshold, the timeout duration is adjusted, as in 916. For example, with each receipt of a RFID tag identifier, the timeout duration may be adjusted based on the last n time durations between instances of receipt of the RFID tag identifier, where n is any defined number. For example, the timeout duration for a RFID tag may be reset or adjusted with each receipt of the RFID tag identifier associated with the RFID tag based on the time duration between each of the last twenty instances of receipt of the RFID tag identifier. In one implementation, the timeout duration may be set as two times the second longest time duration during the last n receipts of the RFID tag identifier.

In other implementations, the timeout duration may be adjusted based on other factors beyond the time duration between receipts of a RFID tag identifier associated with a RFID tag. For example, the signal strength of the received RFID tag identifiers may be considered when determining a weighting factor for use in adjusting the timeout duration. For example, if the signal strengths of the received RFID tag identifier are consistently weak (e.g., −85 dB), the timeout may be increased by three times (weighting factor) that of the second longest time duration that occurred during the last twenty receipts of the RFID tag identifier. In comparison, if the signal strength is consistently strong (e.g., −30 dB), the weighting factor may be a lower multiple (e.g., 1.5×, 2×).

Adjusting the timeout duration based on the time durations between instances of receipt of the RFID tag identifier during the last n receipts of the RFID tag identifier may result in the timeout duration increasing or decreasing. For example, if the time duration between instances of receipt of the RFID tag identifier for a RFID tag decreases, the timeout duration will also decrease. Likewise, if the time duration increases, the timeout duration for the RFID tag will likewise increase.

In some implementations, a decrease in the timeout duration may be gradual. For example, if the timeout duration is to be decreased, an amount of the decrease may be determined. If the amount of the decrease is greater than a decrease threshold, the timeout duration may be decreased by the threshold amount. For example, if the timeout duration is to be adjusted downward by 500 milliseconds, but the threshold amount is 200 milliseconds, the timeout duration is only decreased by 200 milliseconds. By limiting the amount of any one decrease in the timeout duration, the decrease is done gradually, to reduce the potential for a spurious event.

In some implementations, there may be a maximum timeout and a minimum timeout. For example, in some implementations, the timeout duration for a RFID tag may not exceed the maximum timeout (e.g., 5 seconds). Likewise, the implementations may only be able to decrease the timeout duration to a minimum limit (e.g., 30 milliseconds).

In some implementations, the time duration between receipts of a RFID tag identifier may also be utilized to determine if the tag is potentially defective. For example, if the time duration between multiple receipts varies greatly, it may be determined that the RFID tag is potentially defective. Likewise, if the time duration between receipts of RFID tag identifiers for a particular RFID reader varies for all tags, such information may be utilized to determine that the RFID reader is potentially defective.

Figure 10:
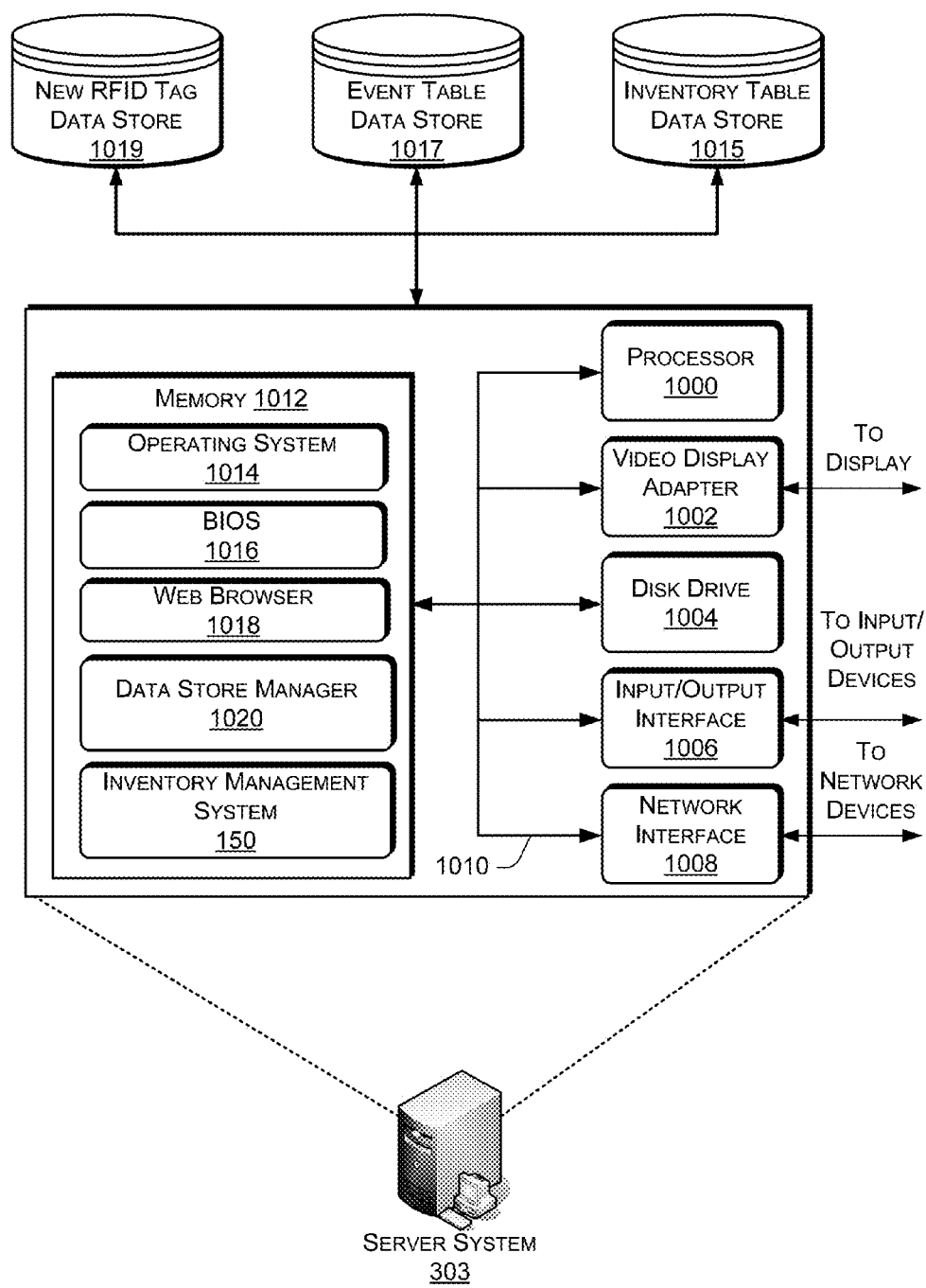
FIG. 10 is a block diagram of an illustrative implementation of a server system that may be used with various implementations.

FIG. 10 is a pictorial diagram of an illustrative implementation of a server system, such as the server system 303, that may be used in the implementations described herein. The server system 303 may include a processor 1000, such as one or more redundant processors, a video display adapter 1002, a disk drive 1004, an input/output interface 1006, a network interface 1008, and a memory 1012. The processor 1000, the video display adapter 1002, the disk drive 1004, the input/output interface 1006, the network interface 1008, and the memory 1012 may be communicatively coupled to each other by a communication bus 1010.

The video display adapter 1002 provides display signals to a local display (not shown in FIG. 10) permitting an operator of the server system 303 to monitor and configure operation of the server system 303. The input/output interface 1006 likewise communicates with external input/output devices not shown in FIG. 10, such as a mouse, keyboard, scanner, or other input and output devices that can be operated by an operator of the server system 303. The network interface 1008 includes hardware, software, or any combination thereof, to communicate with other computing devices. For example, the network interface 1008 may be configured to provide communications between the server system 303 and other computing devices via the network 302, as shown in FIG. 3.

The memory 1012 generally comprises random access memory (RAM), read-only memory (ROM), flash memory, and/or other volatile or permanent memory. The memory 1012 is shown storing an operating system 1014 for controlling the operation of the server system 303. A binary input/output system (BIOS) 1016 for controlling the low-level operation of the server system 303 is also stored in the memory 1012.

The memory 1012 additionally stores program code and data for providing network services that allow the inventory management system 150 to identify users and/or items within the materials handling facility. Accordingly, the memory 1012 may store a browser application 1018. The browser application 1018 comprises computer executable instructions, that, when executed by the processor 1000, generate or otherwise obtain configurable markup documents such as Web pages. The browser application 1018 communicates with a data store manager application 1020 to facilitate data exchange between the inventory table data store 1015, the event table data store 1017, the new RFID tag data store 1019 and/or other data stores.

As used herein, the term "data store" refers to any device or combination of devices capable of storing, accessing and retrieving data, which may include any combination and number of data servers, databases, data storage devices and data storage media, in any standard, distributed or clustered environment. The server system 303 can include any appropriate hardware and software for integrating with the data stores 1015-1019 as needed to execute aspects of the inventory management system 150.

The data stores 1015-1019 can include several separate data tables, databases or other data storage mechanisms and media for storing data relating to a particular aspect. For example, the data stores 1015-1019 illustrated include mechanisms for maintaining inventory information (e.g., item locations, RFID tag identifiers associated with items, timeout durations for each RFID tag), etc., which can be used to efficiently track inventory within a materials handling facility.

It should be understood that there can be many other aspects that may be stored in the data stores 1015-1019. The data stores 1015-1019 are operable, through logic associated therewith, to receive instructions from the server system 303 and obtain, update or otherwise process data in response thereto.

The memory 1012 may also include the inventory management system 150, discussed above. The inventory management system 150 may be executable by the processor 1000 to implement one or more of the functions of the server system 303. In one implementation, the inventory management system 150 may represent instructions embodied in one or more software programs stored in the memory 1012. In another implementation, the inventory management system 150 can represent hardware, software instructions, or a combination thereof.

The server system 303, in one implementation, is a distributed environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 10. Thus, the depiction in FIG. 10 should be taken as being illustrative in nature and not limiting to the scope of the disclosure.

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A method for tracking inventory, comprising:
determining a first receipt by an antenna element of a first radio frequency identification ("RFID") tag identifier;
determining a second receipt by the antenna element of the first RFID tag identifier;
determining that the first RFID tag identifier is not included in an inventory table;
determining a first timeout duration for the first RFID tag identifier based at least in part on a first time duration between the first receipt by the antenna element of the first RFID tag identifier and the second receipt by the antenna element of the first RFID tag identifier;
storing the first RFID tag identifier and the first timeout duration in the inventory table;
determining a third receipt by the antenna element of a second RFID tag identifier;
determining a fourth receipt by the antenna element of the second RFID tag identifier;
determining that the second RFID tag identifier is not included in the inventory table;
determining a second timeout duration for the second RFID tag identifier based at least in part on a second time duration between the third receipt by the antenna element of the second RFID tag identifier and the fourth receipt by the antenna element of the second RFID tag identifier, wherein the first timeout duration for the first RFID tag identifier and the second timeout duration for the second RFID tag identifier are different; and storing the second RFID tag identifier and the second timeout duration in the inventory table.

2. The method of claim 1, further comprising:
determining a fifth receipt of the first RFID tag identifier by the antenna element;
determining that a third time duration between the second receipt of the first RFID tag identifier and the fifth receipt of the first RFID tag identifier is less than the first timeout duration and exceeds a threshold; and
increasing the first timeout duration based at least in part on the third time duration between the second receipt of the first RFID tag identifier and the fifth receipt of the first RFID tag identifier.

3. The method of claim 1, further comprising:
determining that an amount of time equal to the first timeout duration has elapsed without a fifth receipt of the first RFID tag identifier being received;
removing the first RFID tag identifier from the inventory table; and
sending an event notification that includes the first RFID tag identifier.

4. The method of claim 3, wherein the event notification is an item pick of an item associated with the first RFID tag identifier.

5. A computing system, comprising:
a processor; and
a memory coupled to the processor and storing program instructions that when executed by the processor cause the processor to at least:
receive from a radio frequency identification ("RFID") reader a first instance of a first RFID tag identifier;
receive from the RFID reader a second instance of the first RFID tag identifier;
determine a first timeout duration for the first RFID tag identifier based at least in part on a first time duration between the receipt of the first instance of the first RFID tag identifier and the receipt of the second instance of the first RFID tag identifier, wherein the first timeout duration for the first RFID tag identifier is different than a second timeout duration for a second RFID tag identifier included in a table; and
include the first RFID tag identifier and the first timeout duration in the table.

6. The computing system of claim 5, wherein the program instructions that when executed by the processor further cause the processor to at least:
receive from the RFID reader a second RFID tag identifier;
determine that the second RFID tag identifier is included in an event table;
increase a third timeout duration associated with the second RFID tag identifier based at least in part on a time duration between the receipt by the RFID reader of the second RFID tag identifier and a receipt by the RFID reader of a prior instance of the second RFID tag identifier;
remove the second RFID tag identifier from the event table; and
include the second RFID tag identifier in the table.

7. The computing system of claim 5, wherein the program instructions that when executed by the processor further cause the processor to at least:
determine that the first RFID tag identifier has been received a defined number of times, prior to inclusion of the first RFID tag identifier in the table.

8. The computing system of claim 5, wherein the program instructions that when executed by the processor further cause the processor to at least:
   subsequent to including the first RFID tag identifier in the table:
      determine that an amount of time equal to the first timeout duration has elapsed without a third instance of the first RFID tag identifier being received;
      remove the first RFID tag identifier from the table; and
      provide an event notification.

9. The computing system of claim 8, wherein the event notification is a notification of an item pick of an item associated with the first RFID tag identifier.

10. The computing system of claim 5, wherein the program instructions that when executed by the processor further cause the processor to at least:
   subsequent to including the first RFID tag identifier in the table:
      receive from the RFID reader and prior to an amount of time equal to the first timeout duration elapsing, a second instance of the first RFID tag identifier;
      determine that a third time duration between receipt of the first instance of the first RFID tag identifier and receipt of the second instance of the first RFID tag identifier exceeds a threshold; and
      increase the first timeout duration.

11. The computing system of claim 10, wherein the first timeout duration is increased based at least in part on at least one of:
   an average time duration between a plurality of instances of receipt of the first RFID tag identifier;
   a longest time duration between a plurality of instances of receipt of the first RFID tag identifier;
   a standard deviation of a plurality of instances of receipt of the first RFID tag identifier;
   a signal strength of at least one of a plurality of instances of receipt of the first RFID tag identifier;
   an amount by which the threshold is exceeded;
   input received from a sensor; or
   the first timeout duration.

12. The computing system of claim 10, wherein the program instructions that when executed by the processor further cause the processor to at least:
   determine a longest time duration between a plurality of receipts of the first RFID tag identifier; and
   adjust the first timeout duration to be a multiple of the longest time duration.

13. The computing system of claim 5, wherein the program instructions that when executed by the processor further cause the processor to at least:
   subsequent to including the first RFID tag identifier in the table:
      determine, based at least in part on a first input received from a sensor at a location associated with the RFID reader, that the location is in a first state;
      monitor for receipt from the RFID reader and during the first time duration the first RFID tag identifier;
      determine, based at least in part on a second input received from the sensor, that the location is in a second state;
      adjust the first time duration while the location is in the second state; and
      monitor for receipt from the RFID reader and during the adjusted first time duration the first RFID tag identifier.

14. The computing system of claim 13, wherein:
   the first state is an active state when activity is occurring at the location;
   the second state is an idle state when no activity is occurring at the location; and
   the adjustment to the first time duration is an increase of the first time duration.

15. A method for monitoring radio frequency identification ("RFID") tags, comprising:
   maintaining an inventory table of a plurality of RFID tag identifiers representative of a plurality of RFID tags within a detectable range of a RFID reader;
   for each of the plurality of RFID tags:
      determining a timeout duration; and
      periodically adjusting the timeout duration based at least in part on a time duration between a first instance of receipt by the RFID reader of the representative RFID tag identifier and a second instance of receipt by the RFID reader of the representative RFID tag identifier; and
   wherein a first timeout duration for a first RFID tag of the plurality of RFID tags and a second timeout duration for a second RFID tag of the plurality of RFID tags are different.

16. The method of claim 15, further comprising:
   for at least one of the plurality of RFID tags:
      receiving, before an amount of time equal to the timeout duration elapses, a receipt from the RFID reader of an instance of the representative RFID tag identifier;
      determining that a time duration between the receipt of the representative RFID tag identifier and a prior receipt of the representative RFID tag identifier exceeds a threshold; and
      increasing the timeout duration.

17. The method of claim 15, further comprising:
   for at least one of the plurality of RFID tags:
      receiving, before an amount of time equal to the timeout duration elapses, a receipt from the RFID reader of an instance of the representative RFID tag identifier;
      determining that a time duration between the receipt of the representative RFID tag identifier and a prior receipt of the representative RFID tag identifier is below a threshold; and
      decreasing the timeout duration.

18. The method of claim 15, further comprising:
   for at least one of the plurality of RFID tags:
      receiving, after an expiration of an amount of time equal to the timeout duration, a receipt from the RFID reader of an instance of the representative RFID tag identifier;
      determining that the representative RFID tag identifier is included in an event table;
      increasing the timeout duration associated with the RFID tag;
      removing the RFID tag identifier from the event table; and
      including the RFID tag identifier in the inventory table.

19. The method of claim 18, wherein:
   a RFID tag identifier is added to the event table upon expiration of an amount of time equal to an associated timeout duration without receipt from the RFID reader of the RFID tag identifier; and
   the RFID tag identifier is removed from the event table after a defined period of time.

20. The method of claim 18, further comprising:
prior to receiving the receipt from the RFID reader of the instance of the representative RFID tag identifier:
- determining that an amount of time equal to the timeout duration associated with the RFID tag has elapsed without a RFID tag identifier representative of the RFID tag being received;
- removing the RFID tag identifier from the inventory table; and
- generating an event of an item pick for an item associated with the RFID tag.

* * * * *